United States Patent
Witt et al.

(10) Patent No.: US 9,434,339 B2
(45) Date of Patent: Sep. 6, 2016

(54) INFLATABLE SEAT BELT WITH A TETHERED GAS DELIVERY FILL TUBE

(71) Applicant: Autoliv ASP, Inc., Ogden, UT (US)

(72) Inventors: John Witt, Clinton Township, MI (US); Frank Fontana, Washington Township, MI (US); Kevin Hixenbaugh, Flushing, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/469,913

(22) Filed: Aug. 27, 2014

(65) Prior Publication Data
US 2016/0059819 A1    Mar. 3, 2016

(51) Int. Cl.
*B60R 21/18* (2006.01)
*B60R 22/12* (2006.01)
*B60R 21/261* (2011.01)

(52) U.S. Cl.
CPC ............. *B60R 21/18* (2013.01); *B60R 22/12* (2013.01); *B60R 2021/2612* (2013.01)

(58) Field of Classification Search
CPC . B60R 21/18; B60R 21/261; B60R 21/2165; B60R 21/2338; B60R 22/12; B60R 22/1954; B60R 22/28
See application file for complete search history.

(56) References Cited

U.S. PATENT DOCUMENTS

| | | | |
|---|---|---|---|
| 4,941,710 A * | 7/1990 | Baymak | B60R 22/16 297/471 |
| 5,390,953 A * | 2/1995 | Tanaka | B60R 21/18 280/733 |
| 5,393,091 A * | 2/1995 | Tanaka | B60R 21/18 280/733 |
| 5,466,002 A * | 11/1995 | Tanaka | B60R 21/01 280/733 |
| 5,466,003 A * | 11/1995 | Tanaka | A44B 11/2523 280/733 |
| 6,019,388 A * | 2/2000 | Okazaki | A44B 11/2523 280/733 |
| 6,082,763 A * | 7/2000 | Kokeguchi | B60R 21/18 280/733 |
| 6,244,621 B1 * | 6/2001 | Kameyoshi | B60R 21/18 280/733 |
| 6,340,173 B1 * | 1/2002 | Specht | B60R 21/18 280/733 |
| 6,361,072 B1 * | 3/2002 | Barnes | B60R 21/233 280/728.1 |
| 6,715,788 B2 | 4/2004 | Saiguchi et al. | |
| 6,837,079 B1 * | 1/2005 | Takeuchi | D04B 21/14 280/733 |
| 7,607,687 B2 | 10/2009 | Clute et al. | |
| 8,585,084 B1 | 11/2013 | Schneider | |
| 8,840,137 B2 | 9/2014 | Schneider et al. | |
| 2002/0067031 A1 * | 6/2002 | Busgen | B60R 21/18 280/733 |
| 2002/0125702 A1 * | 9/2002 | Ohhashi | B60R 21/18 280/733 |
| 2003/0166367 A1 * | 9/2003 | Berger | B60R 21/235 442/76 |
| 2006/0055158 A1 * | 3/2006 | Park | B60R 21/18 280/733 |

(Continued)

*Primary Examiner* — Barry Gooden, Jr.
(74) *Attorney, Agent, or Firm* — Stephen T. Olson; Harness, Dickey & Pierce, P.L.C.

(57) ABSTRACT

A restraint device for restraining an occupant in a vehicle includes a belt, an inflator, a gas guide, and a flexible tether. The belt includes a first layer, a second layer, and a seal between the first and second layers. The first and second layers extend from a first end of the belt to a second end of the belt. The seal cooperates with the first and second layers to form an inflatable portion of the belt. The inflator is operable to provide pressurized gas. The gas guide has a first end placed over an outlet of the inflator and a second end extending into the inflatable portion of the belt. The flexible tether secures the gas guide to the belt.

19 Claims, 18 Drawing Sheets

(56) References Cited

U.S. PATENT DOCUMENTS

| | | | | |
|---|---|---|---|---|
| 2006/0076764 | A1* | 4/2006 | Freeman | B60R 22/12 280/801.1 |
| 2006/0290114 | A1* | 12/2006 | Suyama | B60R 21/18 280/733 |
| 2007/0080528 | A1* | 4/2007 | Itoga | B60R 21/18 280/733 |
| 2009/0051150 | A1* | 2/2009 | Murakami | B60R 21/18 280/733 |
| 2009/0066063 | A1* | 3/2009 | Mical | B60R 21/18 280/733 |
| 2011/0006507 | A1* | 1/2011 | Fukawatase | B60R 21/18 280/733 |
| 2012/0169034 | A1* | 7/2012 | Yamataki | B60R 21/18 280/733 |
| 2012/0261911 | A1* | 10/2012 | Baca | B60R 21/18 280/733 |
| 2013/0113194 | A1 | 5/2013 | Burczyk et al. | |
| 2013/0264803 | A1* | 10/2013 | Schneider | B60R 21/18 280/733 |
| 2014/0042793 | A1* | 2/2014 | Fiore | B60N 2/2812 297/484 |
| 2014/0239622 | A1* | 8/2014 | Yamataki | B60R 21/18 280/733 |
| 2015/0054264 | A1* | 2/2015 | Hirako | B60R 21/18 280/728.3 |
| 2015/0069741 | A1* | 3/2015 | Shimazu | B60R 21/18 280/728.3 |
| 2015/0232054 | A1* | 8/2015 | Sundararajan | B32B 37/06 280/733 |
| 2016/0075299 | A1* | 3/2016 | Wang | B60R 21/18 280/728.2 |

* cited by examiner

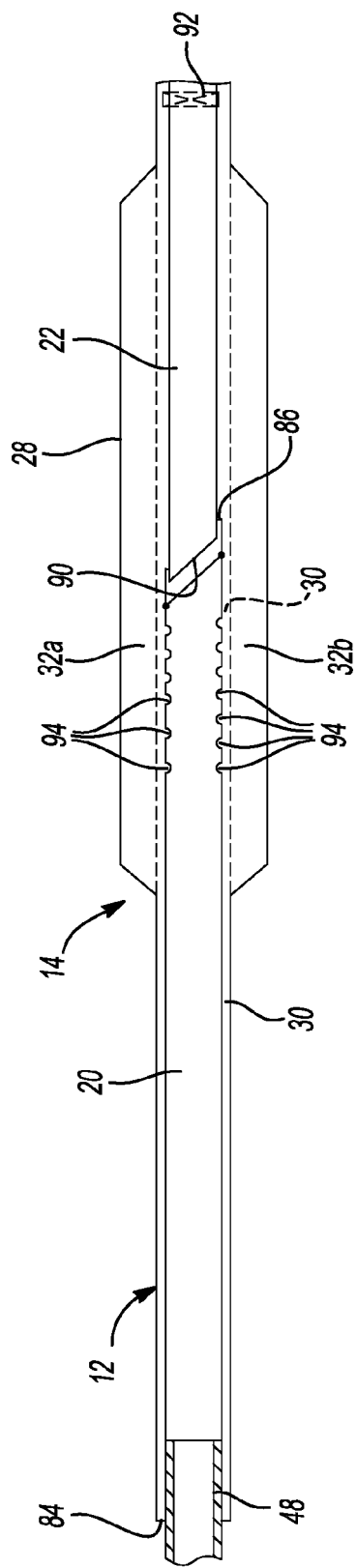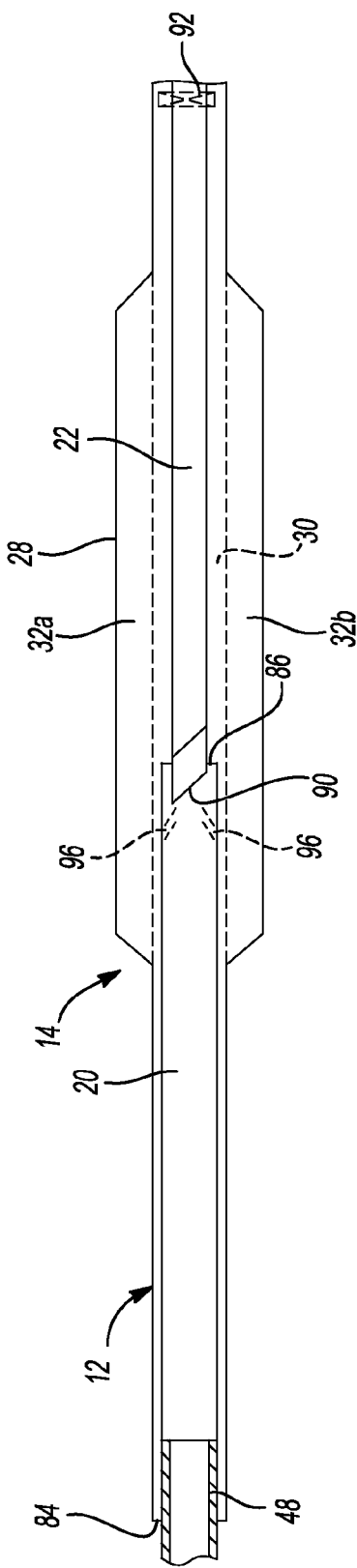

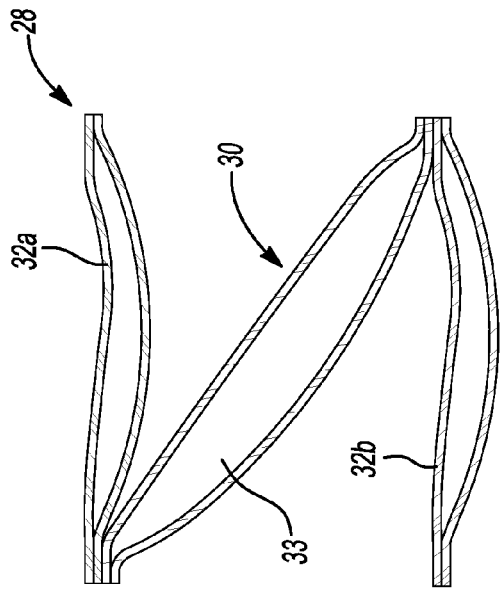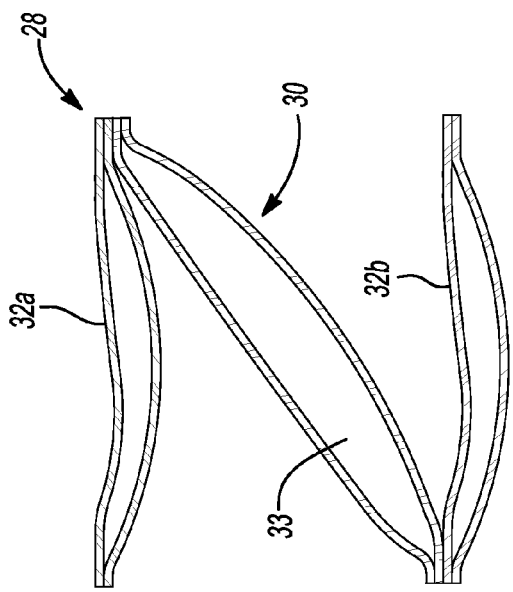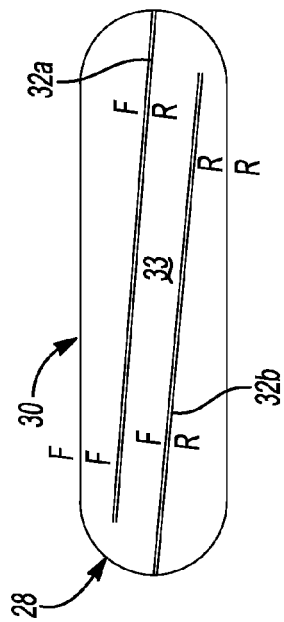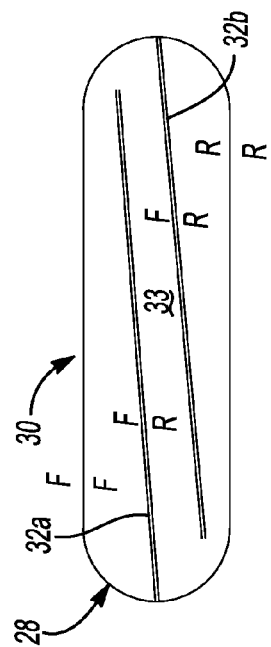

INFLATABLE SEAT BELT WITH A TETHERED GAS DELIVERY FILL TUBE

FIELD

The present disclosure relates to an inflatable seat belt, and more particularly to tethered gas deliver fill tube for an inflatable seat belt.

BACKGROUND

This section provides background information related to the present disclosure which is not necessarily prior art.

Vehicles such as automobiles typically include one or more airbags that work in conjunction with one another and with other safety systems to absorb or otherwise dissipate energy associated with an impact event away from occupants of the vehicle. For example, a vehicle such as an automobile may incorporate one or more front airbags mounted in a steering wheel or instrument panel of the vehicle that absorb energy associated with a front-impact event. Likewise, a vehicle may additionally incorporate a side airbag in a door, pillar and/or seat assembly of the vehicle in an effort to absorb energy associated with a side-impact event.

Vehicles also include seatbelt assemblies that work in conjunction with inflatable restraints such as front airbags and side airbags. In fact, some seatbelt assemblies incorporate an inflatable portion that works in conjunction with the seatbelt assembly to absorb forces associated with an impact event and/or to direct such forces into the structure of the vehicle and away from vehicle occupants.

Seatbelt assemblies that have an integral inflatable portion or an airbag attached to webbing of the seatbelt assembly typically include a shoulder-mounted retractor that selectively allows the webbing to payout from the retractor so that the webbing can be properly positioned relative to a vehicle occupant. Such seatbelt assemblies also include an inflator that provides pressurized gas to the inflatable portion or the airbag and a fill tube that delivers the pressurized gas from the inflator to the inflatable portion or the airbag.

One end of the fill tube is typically placed over an end of the inflator and the other end of the fill tube is inserted into the inflatable portion or the airbag. The fill tube may be stiffer and thicker than the inflatable portion or the airbag. Thus, the length of the inflatable portion or the airbag through which the fill tube extends may be less flexible and thicker than the remaining length of the inflatable portion or the airbag, which may result in discomfort to the occupant. In addition, the thickness and stiffness of the fill tube may impede extraction and retraction of the seatbelt assemblies. Further, when the fill tube delivers pressurized gas to the inflatable portion or the airbag, the fill tube may back out of the inflatable portion or the airbag. Moreover, the position of the fill tube may change in a manner that causes kinks to develop in the fill tube and/or causes the inflatable portion or the airbag to inflate in an undesired manner.

To prevent the fill tube from back out of the inflatable portion or the airbag, the fill tube may be attached directly to the inner surface of the inflatable portion or the airbag (e.g., using adhesive) at multiple locations along the length of the fill tube. However, the attachments may be stiffer and harder than the inflatable portion or the airbag and therefore may also result in discomfort to the occupant. In addition, the attachments between the fill tube and the inflatable portion or the airbag are subjected to relatively high load when the fill tube delivers the pressurized gas to the inflatable portion. As a result, the attachments between the fill tube and the inflatable portion or the airbag may fail, in which case the fill tube may back out of the inflatable portion or the airbag and/or the position of the fill tube may change in an undesired manner.

Further, the fill tube may not deliver pressurized gas to the inflatable portion or the airbag at the locations where the fill tube is attached to the inner surface of the inflatable portion or the airbag. Thus, the number of directions around the perimeter of the fill tube in which the fill tube distributes the pressurized gas to the inflatable portion or the airbag may be limited due to the attachment between the fill tube and the inflatable portion. For example, the angular range around the perimeter of the fill tube in which the fill tube distributes gas may be less than 360 degrees.

SUMMARY

This section provides a general summary of the disclosure, and is not a comprehensive disclosure of its full scope or all of its features.

A restraint device for restraining an occupant in a vehicle is provided. The restraint device includes a belt, an inflator, a gas guide, and a tether. The belt includes a first layer, a second layer, and a seal between the first and second layers. The first and second layers extend from a first end of the belt to a second end of the belt. The seal cooperates with the first and second layers to form an inflatable portion of the belt.

The inflator is operable to provide pressurized gas. The gas guide is configured to deliver pressurized gas from the inflator to the inflatable portion of the belt. The tether has a first end attached to the gas guide and a second end attached to an inner surface of the belt to secure the gas guide to the belt.

In another configuration, a restraint device for restraining an occupant in a vehicle is provided. The restraint device includes a belt, an inflator, a gas guide, and a flexible tether. The belt includes a first layer, a second layer, and a seal between the first and second layers. The first and second layers extend from a first end of the belt to a second end of the belt. The seal cooperates with the first and second layers to form an inflatable portion of the belt.

The inflator is operable to provide pressurized gas. The gas guide has a first end placed over an outlet of the inflator and a second end extending into the inflatable portion of the belt. The flexible tether secures the gas guide to the belt.

In yet another configuration, a restraint device for restraining an occupant in a vehicle is provided. The restraint device includes a belt, an inflator, a gas guide, and a tether. The belt includes a first layer, a second layer, and a seal between the first and second layers. The first and second layers extend from a first end of the belt to a second end of the belt. The seal cooperates with the first and second layers to form an inflatable portion of the belt. The inflatable portion has a winged section including a first wing, a second wing, and a tear seam separating an interior of the inflatable portion from interiors of the first and second wings. The first and second wings are disposed within the inflatable portion.

The inflator is operable to provide pressurized gas. The gas guide has a first end placed over an outlet of the inflator and a second end extending into the inflatable portion of the belt. The tether secures the gas guide to the belt.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is planar view of a portion of the restraint device of FIG. 1 illustrating the belt, the gas guide, and a tether before the belt is inverted, the gas guide including radial holes disposed about the perimeter of the gas guide;

FIG. 5 is planar view of a portion of the restraint device of FIG. 1 illustrating the belt, the gas guide, and a tether before the belt is inverted, the gas guide including angled slits disposed on opposite sides of the gas guide;

FIGS. 11 and 12 are schematic section views of a portion of the restraint device of FIG. 1 illustrating a Z-shaped cross section of the belt;

FIGS. 13 and 14 are schematic section views of a variation of the restraint device of FIG. 1 in which the belt has an S-shaped cross section;

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
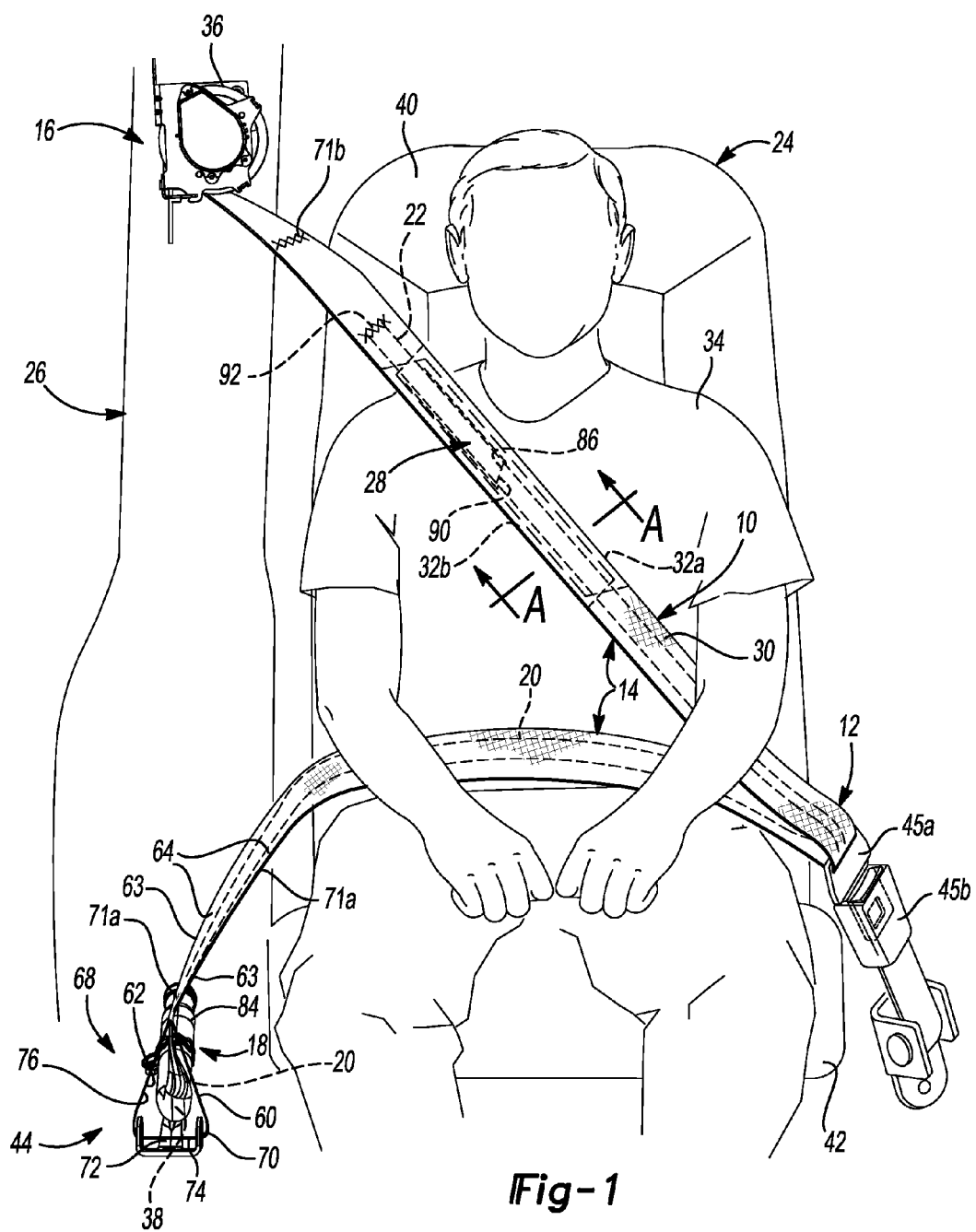
FIG. 1 is a perspective view of a portion of a vehicle including a restraint device according to the principles of the present disclosure for restraining an occupant in a seat assembly of the vehicle.

Referring now to FIG. 1, a restraint device 10 includes a belt 12 having an inflatable portion 14, a retractor 16 that selectively pays out a portion of the belt 12 or retracts the belt 12, and an inflator assembly 18 that selectively alters the inflatable portion 14 from a pre-deployed state to a deployed or inflated state. The restraint device 10 further includes a gas guide 20 that delivers gas from the inflator assembly 18 to one or more locations within the inflatable portion 14, and a tether 22 that secures the gas guide 20 to the belt 12. The restraint device 10 may be used in conjunction with a seat assembly 24 of a vehicle 26 such as, for example, an automobile, an aircraft, a train, or a bus.

The belt 12 may be formed from a woven material such as, for example, seatbelt webbing and/or airbag-cushion material. Specifically, the belt 12 may be formed from conventional seatbelt webbing, a cut-and-sewn airbag-cushion material, a one-piece woven (OPW) airbag-cushion material, and/or a laminate airbag-cushion material.

The inflatable portion 14 of the belt 12 may be integrally formed with the remainder of the belt 12. The inflatable portion 14 includes a winged section 28 that, when inflated, has a larger diameter or cross-sectional area than the remainder of the inflatable portion 14. The winged section 28 may be positioned at virtually any location along a length of the belt 12. The belt 12 includes an outer shell 30 that extends along the entire length of the belt 12, and the winged section 28 includes first and second wings 32a and 32b that are disposed within a sealed interior 33 (FIG. 8) of the outer shell 30. The wings 32a, 32b may be formed from the same material as the outer shell 30. For example, the outer shell 30 and the wings 32a, 32b may both be formed from conventional seatbelt webbing. Alternatively, the wings 32a, 32b may be formed from a different material than the outer shell 30. For example, the wings 32a, 32b may be formed from an airbag-cushion material and the outer shell 30 may be formed from conventional seatbelt webbing. If the wings 32a, 32b are formed from airbag-cushion material and the outer shell 30 is formed from seatbelt webbing, the wings 32a, 32b may be attached to the outer shell 30 via stitching. In order to ensure a uniform tensile strength of the belt 12, layers of the outer shell 30 may be continuous pieces of material along the length of the belt 12.

The inflatable portion 14 may be positioned along the length of the belt 12 such that the inflatable portion 14 is positioned across the lap and the torso of an occupant 34 when seated in the seat assembly, as shown in FIG. 1. The winged section 28 of the inflatable portion 14 may be positioned along the length of the belt 12 such that the winged section 28 is positioned across the torso of the occupant 34, as shown in FIG. 1. The inflatable portion 14 may be altered from a pre-deployed state (FIG. 1) to an inflated or deployed state (FIG. 9) via the inflator assembly 18. Specifically, the inflatable portion 14 may be filled with a pressurized gas received from the inflator assembly 18 in an effort to utilize the inflatable portion 14 as a cushion to dissipate forces associated with an impact event experienced by the vehicle 26 away from the occupant 34. Since the inflatable portion 14 is integrally formed with the remainder of the belt 12, the inflatable portion 14 may not move or shift out of position when the inflatable portion 14 is deployed. Thus, force from the outer shell 30 may only be transferred to the occupant 34 through the inflatable portion 14, which may absorb shock to minimize the amount of force absorbed by the occupant 34.

The belt 12 has a first end 36 and a second end 38 that are each connected to one of the seat assembly 24 and the vehicle 26. Specifically, the first end 36 may be attached to one of the seat assembly 24 and the vehicle 26 proximate to a top portion of a seatback 40 of the seat assembly 24. The first end 36 may be attached to the seat assembly 24 or to the vehicle 26 proximate to the top portion of the seatback 40 such that the first end 36 is positioned at an end of the seatback 40 opposite from a junction of the seatback 40 and a seat bottom 42 of the seat assembly 24. In so doing, the first end 36 is positioned proximate to a shoulder of the occupant 34. Conversely, the second end 38 may be attached to one of the seat assembly 24 and the vehicle 26 proximate to the seat bottom 42. As such, the second end 38 may be positioned proximate to a hip of the occupant 34 when in use.

While the first end 36 and the second end 38 of the belt 12 may be attached to either the seat assembly 24 or the vehicle 26, the first end 36 and the second end 38 are described and shown in FIG. 1 as being attached to the vehicle 26. The first end 36 may be attached to the vehicle 26 via the retractor 16 and the second end 38 may be attached to the vehicle 26 via an anchor 44, as shown in FIG. 1. Alternatively, the first end 36 may be attached to the vehicle 26 via the anchor 44, and the second end 38 may be attached to the vehicle 26 via the retractor 16.

Although the belt 12 shown in FIG. 1 extends across the lap and torso of the occupant 34, a belt according to the principles of the present disclosure may only extend across the lap of the occupant 34. In addition, while the winged section 28 of the belt 12 is shown extending across the torso of the occupant 34, the winged section 28 may extend across both the lap and torso of the occupant 34. Further, in FIG. 1, the inflator assembly 18 and the anchor 44 are shown attached to the vehicle 26 near the seat bottom 42, and the retractor 16 is shown attached to the vehicle 26 near the top portion of the seatback 40. However, the inflator assembly 18 and the anchor 44 may be attached to the vehicle 26 near the seat bottom 42, and the retractor 16 may be attached to the vehicle 26 near the top portion of the seatback 40.

The retractor 16 may be a so-called load-limiting retractor or load-limiting anchor, or, alternatively, may be a pre-tensioning retractor. Accordingly, the retractor 16 does not payout any of the belt 12 during normal use of the restraint device 10. Rather, the retractor 16 only pays out a length of the belt 12 when the belt 12 is subjected to a force of a predetermined magnitude. Namely, when the vehicle 26 experiences an impact event, the occupant 34 may exert a force on the belt 12 that meets or exceeds a predetermined threshold, thereby causing the retractor 16 to payout a predetermined length of the belt 12. In one configuration, the retractor 16 may payout approximately 150-250 mm of webbing when the occupant 34 loads the belt 12. If the retractor 16 is a so-called pre-tensioning retractor, the retractor 16 may spool a portion of the belt 12 when the vehicle 26 experiences an impact event. In so doing, the belt 12 exerts a force on the occupant 34 via the retractor 16 to draw the torso of the occupant 34 toward the seatback 40.

While the retractor 16 is described as being a load-limiting retractor or a pre-tensioning retractor, the retractor 16 could alternatively function as a conventional retractor that pays out a relatively short length of webbing when a force is applied to the belt 12 during normal use of the restraint device 10. For example, the retractor 16 may be configured to payout a relatively small amount of webbing when a force is applied to the belt 12 to allow the occupant 34 a wide range-of-motion when seated in the seat assembly 24. For example, the retractor 16 may allow the occupant 34 to exert a force on the belt 12 to payout 150-250 mm of webbing during normal use of the restraint device 10. When the force applied to the belt 12 is released, however, the retractor 16 may once again spool the webbing to reduce the effective length of the belt 12. When the belt 12 is positioned relative to the occupant at a desired location, the belt 12 may be retained at the desired location by inserting a tongue 45a into a buckle 45b.

When the anchor 44 is used to attach the second end 38 of the belt 12 to the vehicle 26, the second end 38 may be fixed for movement with the vehicle 26. Alternatively, the second end 38 may be attached to the vehicle 26 via the anchor 44 in such a way that the anchor 44 is permitted to rotate relative to the vehicle 26 but is not permitted to move in a direction along a longitudinal axis of the belt 12. In either configuration, whether the anchor 44 is permitted to rotate relative to the vehicle 26 or is fixed for movement with the vehicle 26, movement of the second end 38 of the belt 12 away from the vehicle 26 is not permitted. Because the second end 38 of the belt 12 is not permitted to move away from the vehicle 26, the inflator assembly 18 may be positioned proximate to the second end 38 of the belt 12, as shown in FIG. 1.

Figure 2:
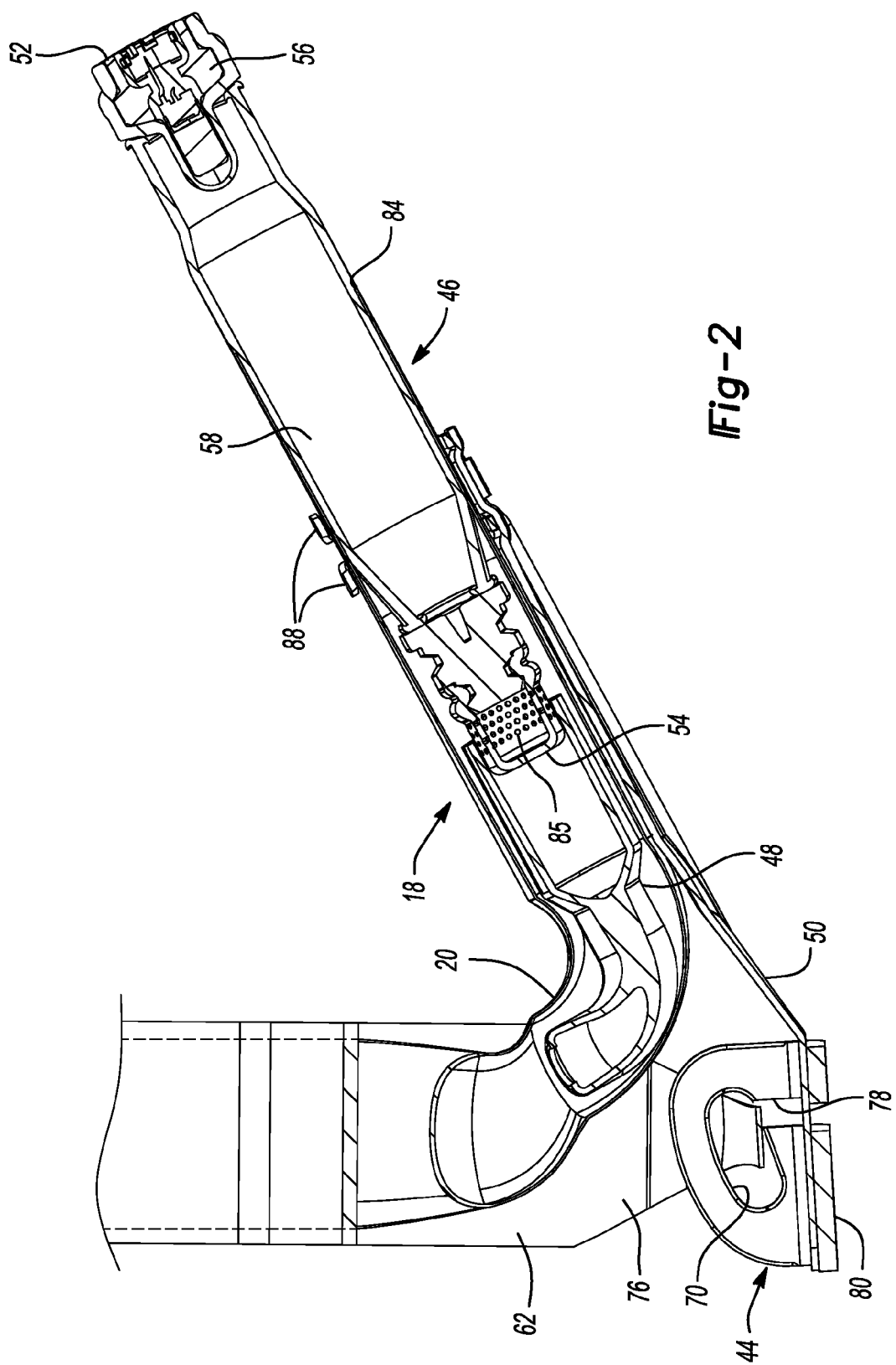
FIG. 2 is a section view of a portion of the restraint device of FIG. 1 including an inflator, a fill tube, an anchor, and portions of a belt.
Figure 3:
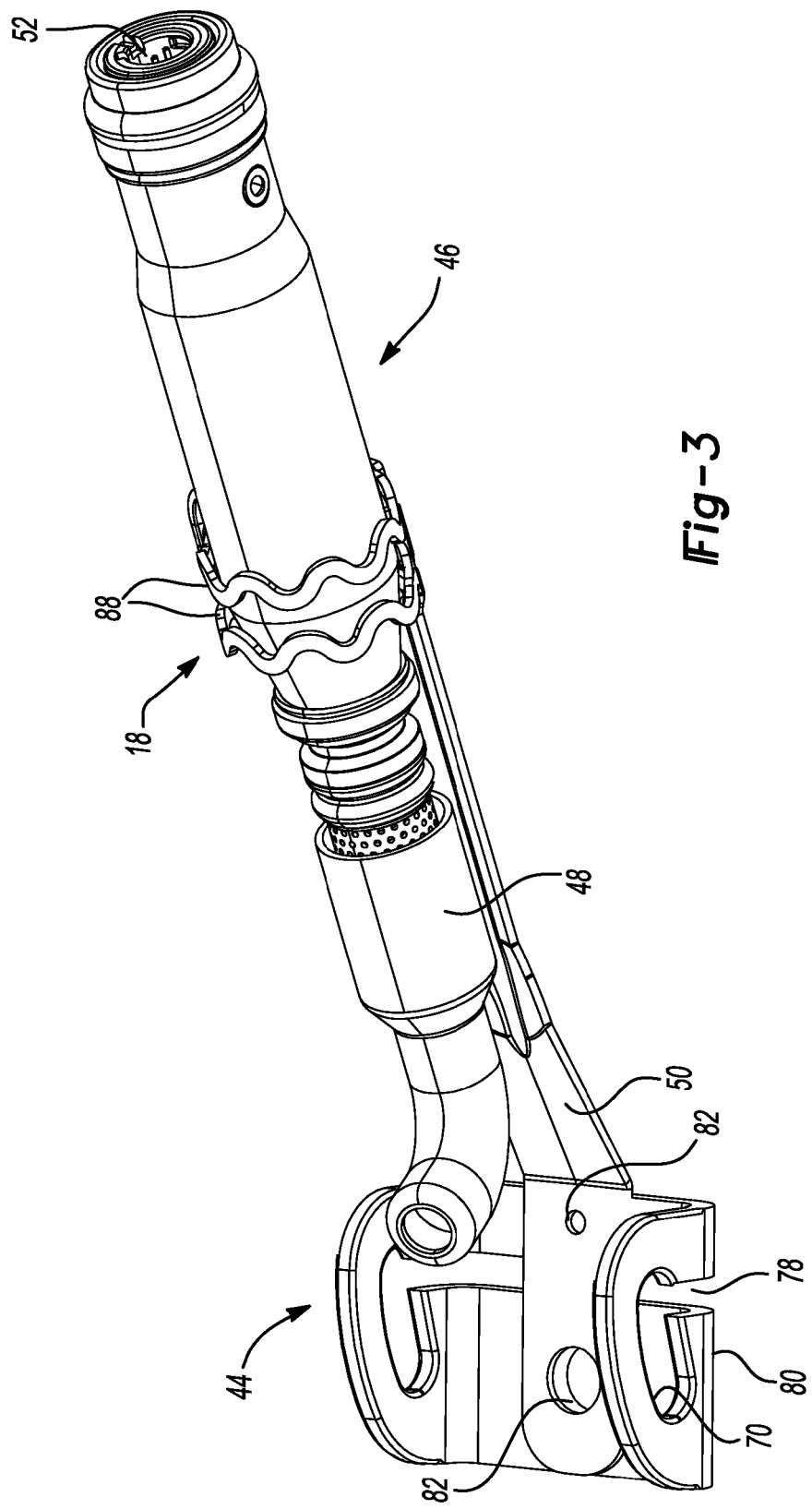
FIG. 3 is a perspective view of the portion of the restraint device shown in FIG. 2 with the belt removed.

With additional reference to FIGS. 2 and 3, the inflator assembly 18 includes an inflator 46 and a fill tube 48. The inflator 46 and the fill tube 48 may be formed from metal and/or plastic. The inflator 46 may be attached to one of the seat assembly 24 and the vehicle 26 via a bracket 50 such that the inflator 46 and bracket 50 are fixed for movement with the seat assembly 24 or the vehicle 26. The inflator 46 has a first end 52 that attaches to an electrical system (not shown) of the vehicle 26 and a second end 54 in fluid communication with the fill tube 48. The inflator 46 includes a squib 56 disposed at the first end 52 of the inflator 46 and a radial diffuser 58 disposed at the second end 54 of the inflator 46. The squib 56 ignites a pyrotechnic material disposed within the inflator 46 to generate or release high-pressure gas. Alternatively, the inflator 46 may be a cold gas inflator that releases compressed high-pressure gas without igniting a pyrotechnic material. The high-pressure gas may be helium, argon, or a mixture thereof. The high-pressure gas may be communicated to the inflatable portion 14 of the belt 12 via the radial diffuser 58 and the fill tube 48 to alter the inflatable portion 14 from the pre-deployed state to the inflated state.

The outer shell 30 of the belt 12 includes first and second layers 60 and 62. In the inflatable portion 14 of the belt 12, outer edges 64 of the first and second layers 60 and 62 are joined together via stitching 63 to form the sealed interior 33 (FIG. 8) of the outer shell 30. In addition to the inflatable portion 14, the belt 12 may include a loop portion 68 disposed at the second end 38 of the belt 12 and extending through openings 70 in the anchor 44 to secure the belt 12 to the anchor 44. In the loop portion 68, the outer edges 64 of the first and second layers 60 and 62 are not joined together such that the first and second layers 60 and 62 can be spread apart from each other as shown in FIG. 1. The loop portion 68 is separated from the inflatable portion 14 by a first seal 71a, which may be formed via stitching. The inflatable portion 14 may extend from the loop portion 68 to the first end 36 of the belt 12. The belt 12 may include a second seal 71b such that the inflatable portion 14 does not extend to the retractor 16 when the belt 12 is fastened around the occupant 34 in a desired position. The first and second seals 71a and 71b and the stitching 63 between the first and second layers 60 and 62 may comprise a seal that cooperates with the first and second layers 60 and 62 to form the sealed interior 33 of the outer shell 30.

The first layer 60 may have a first end 72, the second layer may have a second end 74, and the first and second ends 72 and 74 may be jointed together via stitching to form a loop 76. The loop 76 may be formed prior to securing the belt 12 to the anchor 44. Then, to secure the belt 12 to the anchor 44, the loop 76 may be slid through a slot 78 (FIG. 3) in the anchor 44 that extends from a bottom surface 80 of the anchor 44 to the openings 70 in the anchor 44. Once the loop 76 is positioned such that the loop 76 extends through the openings 70, the anchor 44 and the inflator bracket 50 may be secured to the vehicle 26 by inserting fasteners (not shown) into holes 82 in the anchor 44 and the bracket 50. In turn, the bottom surface 80 of the anchor 44 may be seated flush against a surface of the vehicle 26 such that the loop 76 of the belt 12 cannot be disassembled from the anchor 44.

As discussed above, the gas guide 20 delivers gas from the inflator assembly 18 to one or more locations within the inflatable portion 14, and the tether 22 secures the gas guide 20 to the belt 12. The gas guide 20 may be a flexible tube or hose and may extend from the inflator assembly 18 to the winged section 28 of the inflatable portion 14 as shown in FIG. 1. The gas guide 20 may be formed from a fabric (e.g., a woven or non-woven material). The gas guide 20 may normally be relatively flat such that the thickness, appearance, and flexibility of the belt 12 are similar to that of a conventional seat belt. When the gas guide 20 delivers gas, the gas guide 20 may have a tubular shape.

The gas guide 20 has a first end 84 attached to and in fluid communication with an outlet 85 (FIG. 2) of the inflator assembly 18, and a second end 86 attached to the tether 22. The first end 84 of the gas guide 20 may be placed over a portion of the inflator assembly 18 including the outlet 85 and may be joined to the inflator assembly 18 using a bracket 88 that clamps around the outer surface of the gas guide 20, as shown in FIG. 2. The second end 86 of the gas guide 20 may be attached to the tether 22 via stitching, thermal bonding, and/or adhesive. The gas guide 20 may deliver gas to the inflatable portion 14 adjacent to the second end 86 and/or through the second end 86.

The tether 22 has a first end 90 attached to the second end 86 of the gas guide 20 and a second end 92 attached to the inner surface of the inflatable portion 14. As with the gas guide 20, the tether 22 may be formed from a fabric (e.g., a woven or non-woven material). However, in contrast to the gas guide 20, the tether 22 is not used to deliver gas to one or more locations in the inflatable portion 14. Thus, the tether 22 may be a relatively thin strip of material rather than a flexible tube or hose, and therefore the tether 22 may be thinner than the gas guide 20. The tether 22 prevents the gas guide 20 from backing out of the inflatable portion 14 when the inflatable portion 14 is deployed. In addition, the tether 22 positions the gas guide 20 within the inflatable portion 14 to prevent kinks from developing in the inflatable portion 14 and to ensure that the inflatable portion 14 inflates in a desired manner. Further, the tether 22 allows the gas guide 20 to move radially while limiting axial movement thereof.

As discussed above, conventional seatbelt assemblies in which a gas guide is attached directly to an inner surface of an inflatable portion of a belt may cause discomfort to the occupant 34 due to contact with the attachment. Thus, the length of the gas guide in such seatbelt assemblies may be greater than the length of the gas guide 20 shown in FIG. 1 such that the attachment is above the shoulder of the occupant 34 to prevent contact between the attachment and the occupant 34. Due to the differences between the gas guide 20 and the tether 22 discussed above, the length of the belt 12 through which the tether 22 extends may be more comfortable to the occupant 34 relative to the length of the belt 12 through which the gas guide 20 extends. In addition, the size (e.g., thickness) of the belt 12 at the location of the tether 22 may be smaller than the size of the belt 12 at the location of the gas guide 20. Thus, the tether 22 may improve the comfort of the occupant 34 and reduce the size of the belt 12 by allowing the length of the gas guide 20 to be reduced.

In addition, the tether 22 may be flexible or elastic to absorb shock when the inflatable portion 14 is deployed. In turn, the amount of load transmitted through the attachment between the gas guide 20 and the tether 22 may be less than the amount of load transmitted through the attachment when the tether 22 is rigid. As a result, the attachment between the gas guide 20 and the tether 22 may be less likely to fail.

The flexibility or elasticity of the tether 22 also aids in assembly of the belt 12 and helps to maintain the shape and position of the gas guide 20 during the life cycle of the belt 12. The tether 22 can be configured to return to its original length after the tether 22 is deformed or to remain in a deformed state and maintain a new length as desired. The decision of whether to configure the tether 22 to return to its original length or maintain a new length may be made based on whether the tether 22 is coated or uncoated, the orientation of fibers within the tether 22, and/or properties of thread used to form the tether 22. The tether 22 may be made flexible or elastic by forming the tether 22 from a flexible material such as nylon, polyester, or an OPW material with a relatively large elastomeric compound. In addition, the tether 22 may be made more elastic by cutting or trimming fabric at a bias angle (e.g., 45 degrees) relative to warp and weft threads of the fabric.

Referring now to FIGS. 4 and 5, the belt 12, the gas guide 20, and tether 22 are shown prior to their assembly. The wings 32a, 32b may initially be disposed outside of the outer shell 30, as shown in FIGS. 4 and 5. The wings 32a, 32b may then be positioned within the sealed interior 33 of the outer shell 30 by folding the wings 32a, 32b over the outer shell 30 and inverting the belt 12 (i.e., turning the entire belt 12 inside out), as described in more detail below.

As discussed above, in conventional seatbelt assemblies, a gas guide is directly attached to an inner surface of an inflatable portion or an airbag at multiple locations along the gas guide. Thus, the number of directions around the perimeter of the fill tube in which the fill tube distributes the pressurized gas to the inflatable portion or the airbag may be limited due to the attachment between the fill tube and the inflatable portion. In contrast, since the gas guide 20 is secured to the inflatable portion 14 via the tether 22, the gas guide 20 may provide radial dispersion in all directions (e.g., 360 degrees) around the perimeter of the gas guide 20. For example, the gas guide 20 may define radial holes 94 adjacent to the second end 86 to distribute gas evenly around the perimeter of the gas guide 20, as shown in FIG. 4. Alternatively, the gas guide 20 may define angled slits 96 adjacent to the second end 86 and disposed on opposite sides of the gas guide 20, as shown in FIG. 5.

Figure 6:
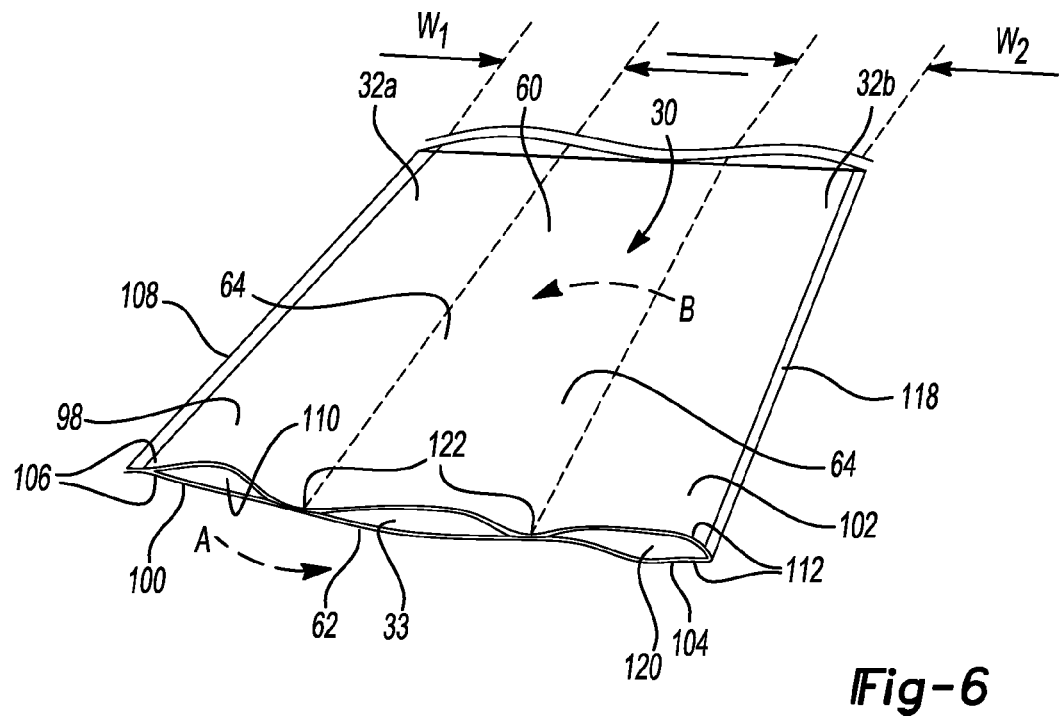
FIGS. 6 through 8 are sectioned perspective views of a portion of the restraint device of FIG. 1 illustrating the belt as wings of the belt are folded over and the belt is inverted to position the wings within an outer shell of the belt.
Figure 7:
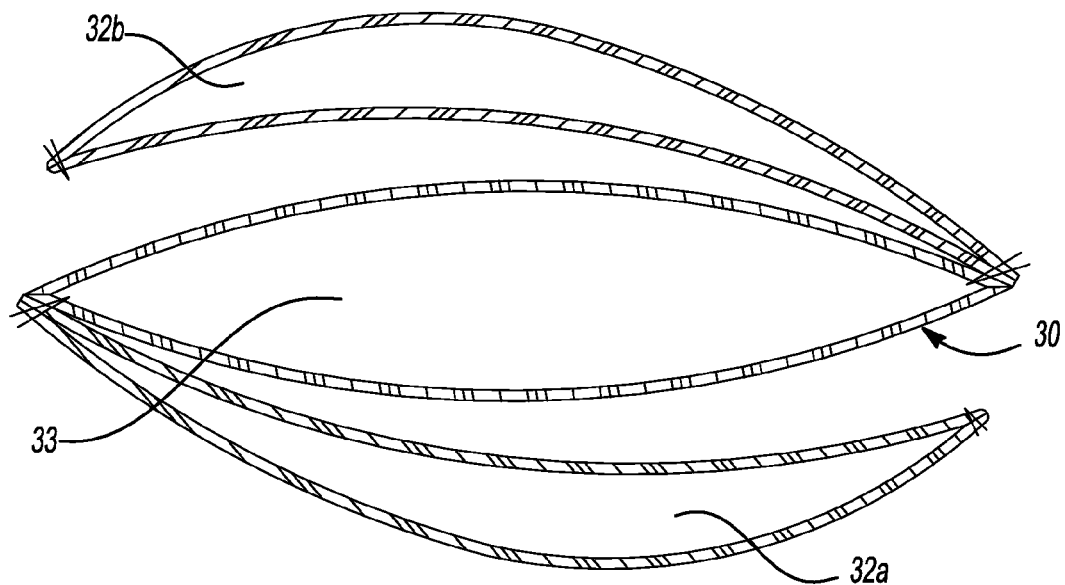
Figure 8:
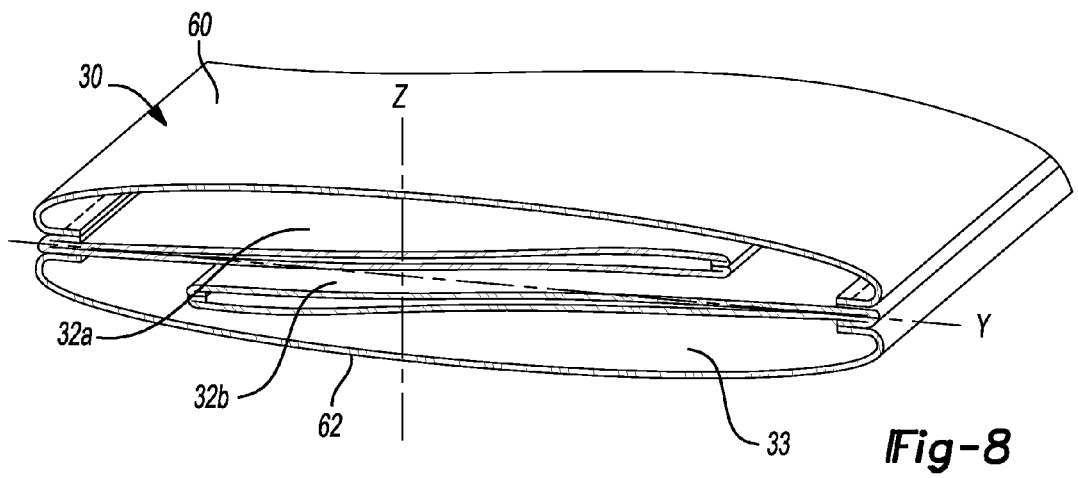

FIGS. 6 through 8 illustrate the change in the configuration of the winged section 28 of the belt 12 as the wings 32a, 32b of the belt 12 are folded and the belt 12 is inverted to position the wings 32a, 32b within the sealed interior 33 of the outer shell 30. The various ways of folding wings of a belt presented herein, including the number and location of the folds, enable increasing the size (e.g., width) of the wings while still being able to package the wings within a typical packaging size of a conventional seatbelt. In turn, the cross-section or diameter of the winged section of the belt may be increased. As a result, the belt may dissipate more energy associated with an impact event away from an occupant of a vehicle relative to smaller diameter inflatable belts.

FIG. 6 shows the winged section 28 before the belt 12 is inverted or turned. As indicated above, in the unturned state, the wings 32a, 32b are disposed outside of the outer shell 30 and extend from the outer edges 64 of the outer shell 30. The wings 32a, 32b may be attached to the outer shell 30 via stitching 97, or the wings 32a, 32b may be integrally formed with the outer shell 30. As with the outer shell 30, the wings 32a, 32b may each include two layers of fabric. The first wing 32a may include first and second layers 98 and 100, and the second wing 32b may include first and second layers 102 and 104. Outer edges 106 of the first and second layers 98 and 100 may be joined together via stitching 108 to form a sealed interior 110 of the first wing 32a. Similarly, outer edges 112 of the first and second layers 114 and 116 may be joined together via stitching 118 to form a sealed interior 120 of the second wing 32b. Tear seams 122 may separate the sealed interior 33 of the outer shell 30 from the sealed interiors 110, 120 of the wings 32a, 32b.

FIG. 7 shows the winged section 28 of the belt 12 after the wings 32a, 32b are folded over the outer shell 30 but before the belt 12 is turned. To alter the winged section 28 from the configuration shown in FIG. 6 to the configuration shown in FIG. 7, the first wing 32a may be folded up in a direction A shown in FIG. 6, and the second wing 32b may be folded down in a direction B shown in FIG. 6. Alternatively, the first wing 32a may be folded down, and the second wing 32b may be folded up.

After the wings 32a, 32b are folded over the outer shell 30, the belt 12 is inverted. FIG. 8 shows the winged section 28 of the belt 12 after the belt 12 is inverted and before the inflatable portion 14 of the belt 12 is deployed. In the inverted, pre-deployed state, the wings 32a, 32b are disposed within the sealed interior 33 of the outer shell 30. As a result, the thickness and appearance of the belt 12 may be similar to that of a conventional seatbelt.

Figure 9:
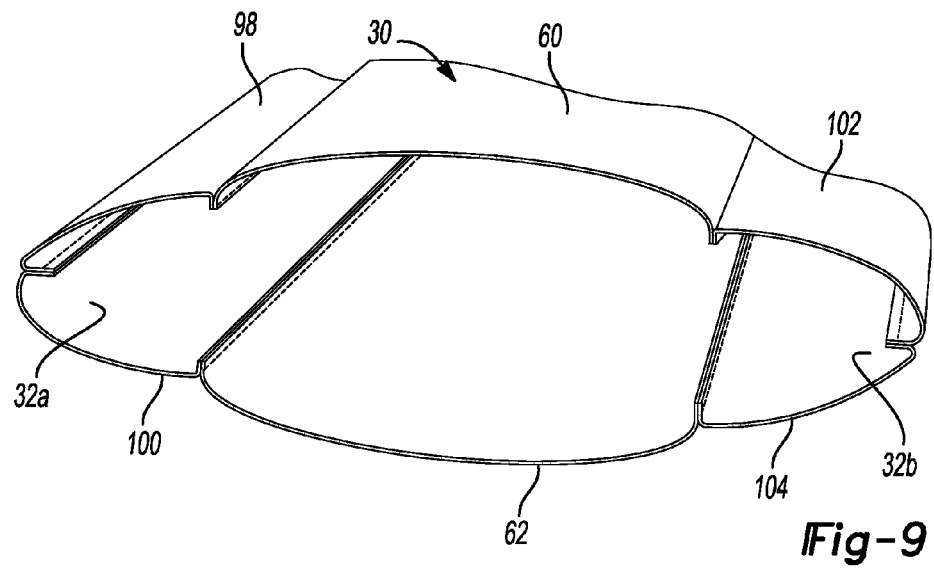
FIG. 9 is a sectioned perspective view of a portion of the restraint device of FIG. 1 illustrating the belt as the belt is deployed.

FIG. 9 shows the winged section 28 of the belt 12 after the inflatable portion 14 is deployed. As the inflatable portion 14 is deployed, the tear seams 122 may tear or break, allowing pressurized gas to flow from the sealed interior 33 of the outer shell 30 to the sealed interiors 110, 120 of the wings 32a, 32b. In turn, the layers 60, 62 of the outer shell 30 separate from each other, and the wings 32a, 32b expand laterally outward from within the sealed interior 33 of the outer shell 30 to outside of the sealed interior 33. As a result, the diameter of the winged section 28 of the belt increases.

As discussed above, the outer shell 30 and the wings 32a, 32b may each include two layers. Thus, when the winged section 28 of the belt 12 is in the inverted, pre-deployed state as shown in FIG. 8, the winged section 28 of the belt 12 may include six layers at any cross section of the winged section 28 along a vertical axis Z extending through the thickness of the belt 12. Therefore, the configuration shown in FIG. 8 may be referred to as a six-layer configuration.

In addition, as shown in FIG. 6, the dimensions (e.g., width W1) of the first wing 32a may be equal to the dimensions (e.g., width W2) of the second wing 32b. Further, as indicated above, the number of layers and folds in the first wing 32a may be equal to the number of layers and folds in the second wing 32b. Thus, the belt 12 may be symmetrical with respect to a lateral axis Y of the outer shell 30. Therefore, the configuration shown in FIG. 8 may be referred to as a symmetrical configuration.

Figure 10:
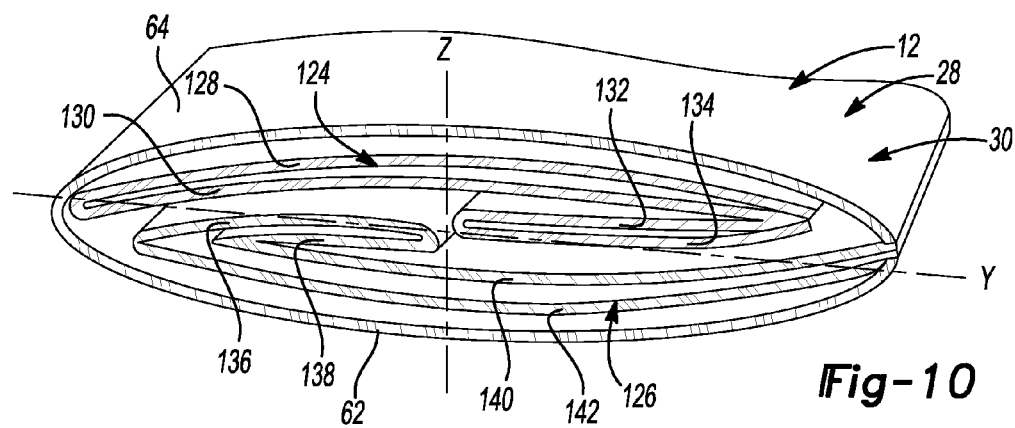
FIG. 10 is a sectioned perspective view of a variation of the restraint device of FIG. 1 in which the belt includes eight layers at any cross section taken through the thickness of the belt.

FIG. 10 shows an alternate configuration of the belt 12 including eight layers at any cross section of the winged section 28 along the vertical axis Z extending through the thickness of the belt 12. In this configuration, the belt 12 includes first and second wings 124 and 126 having widths that are greater than the widths W1, W2 of the wings 32a, 32b. In addition, the wings 124, 126 include an additional fold along their respective lengths, which yields two additional layers at any cross section of the winged section 28 along the vertical axis Z. In this regard, the first wing 124 includes layers 128, 130, 132, and 134, and the second wing 126 includes layers 136, 138, 140, and 142. Thus, on the left side of the vertical axis Z, the belt 12 includes the first and second layers 60 and 62 of the outer shell 30, the layers 128, 130 of the first wing 124, and the layers 136, 138, 140, and 142 of the second wing 126. On the right side of the vertical axis Z, the belt 12 includes the first and second layers 60 and 62 of the outer shell 30, the layers 128, 130, 132, and 134 of the first wing 124, and the layers 136, 138 of the second wing 126.

The folds in the wings 124, 126 at the attachments between the wings 124, 126 and the outer shell 30 may be referred to as full folds since the entire wings 124, 126 are folded onto the outer shell 30. The width of the layers 132, 134, 136, and 138 may be less than or equal to one-half of the width of the layers 128, 130, 140, and 142. Thus, the folds in the wings 124, 126 resulting in the layers 132, 134, 136, and 138 may be referred to as half folds.

FIGS. 11 and 12 illustrate the Z-shaped cross-section of the belt 12 in the winged section 28. FIG. 11 corresponds to FIG. 7 except that the cross section of the belt 12 has been rotated by 180 degrees to show the Z-shape of the cross section. FIG. 12 is a schematic end view of the sectioned perspective view shown in FIG. 8. The outer shell 30 and the wings 32a, 32b may each have a fine side F and a rough side R.

FIGS. 13 and 14 illustrate an alternate configuration of the belt 12 in which the cross section of the winged section 28 has an S-shape. The only difference between the wings 32a, 32b shown in FIGS. 13 and 14 and the wings 32a, 32b shown in FIGS. 11 and 12 is the direction in which the wings 32a, 32b are folded before the belt 12 is inverted. To achieve the configuration shown in FIGS. 11 and 12, the wings 32a and 32b are folded in the directions A and B, respectively, as shown in FIG. 6. To achieve the configuration shown in FIGS. 14 and 13, the wings 32a and 32b are folded in the opposite directions.

Figure 15:
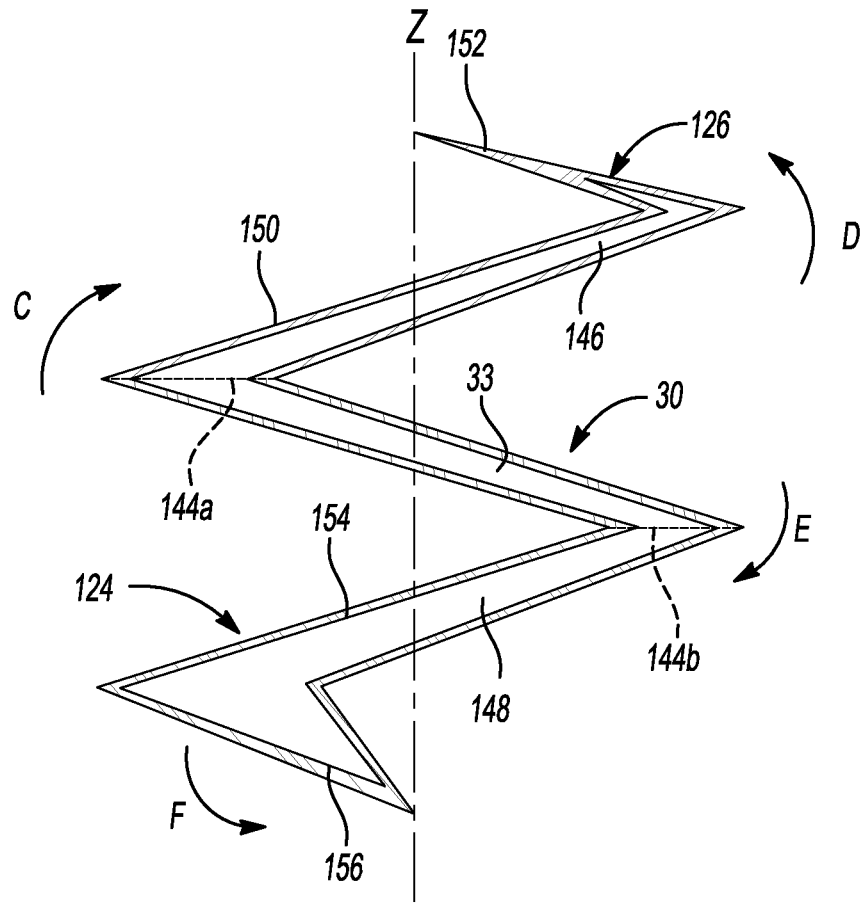
FIGS. 15 and 16 are schematic section views of a variation of the restraint device of FIG. 1 in which the belt includes eight layers and the belt is symmetric with respect to a lateral axis of the belt.
Figure 16:
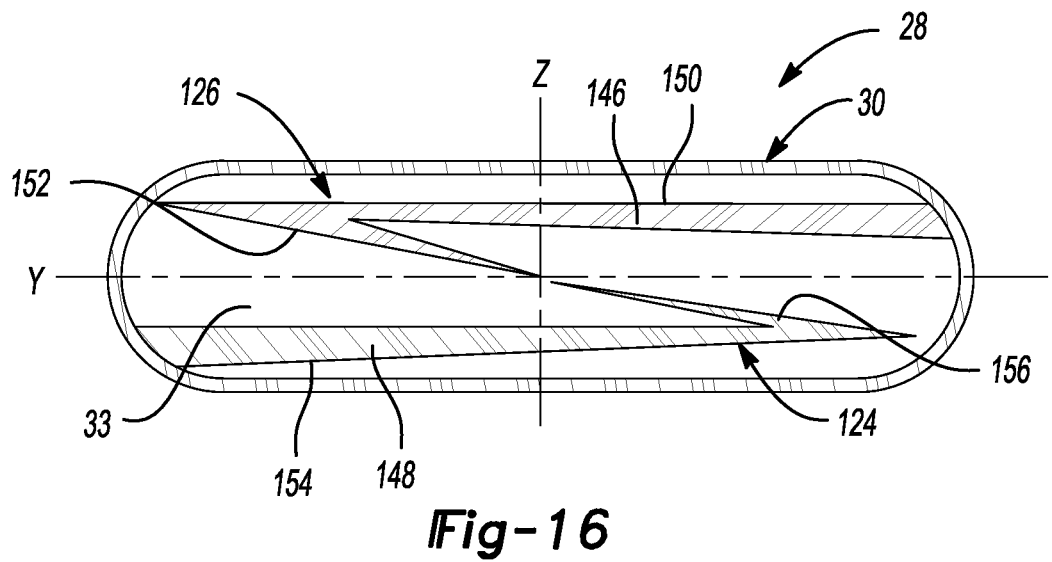

FIGS. 15 and 16 illustrate an 8-layer symmetrical configuration of the belt 12 similar to that shown in FIG. 10 except that the wings 124, 126 are folded in different directions. FIG. 15 shows a cross section of the winged section 28 of the belt 12 after the wings 124, 126 are folded and before the belt 12 is inverted. Tear seams 144a, 144b separate sealed interiors 146, 148 of the wings 124, 126 from the sealed interior 33 of the outer shell 30. To achieve the configuration shown in FIG. 15, a full fold 150 is made by folding up the first wing 124 at the tear seam 144a in a direction C, and a half fold 152 is made by folding up the first wing 124 in a direction D. Similarly, a full fold 154 is made by folding down the second wing 126 at the tear seam 144b in a direction E, and a half fold 156 is made by folding down the second wing 126 in a direction F.

FIG. 16 illustrates to the 8-layer symmetrical configuration of the belt 12 shown in FIG. 15 after the belt 12 is inverted. As shown in FIG. 16, the widths of the full folds 150, 154 of the wings 124, 126 are approximately equal to the width of the outer shell 30. In addition, the widths of the half folds 152, 156 of the wings 124, 126 are approximately equal to one-half of the width of the outer shell 30. Thus, the winged section 28 includes eight layers at any cross section thereof along the vertical axis Z extending through the thickness of the belt 12. In addition, as with the 8-layer symmetrical configuration shown in FIG. 10, the belt 12 is symmetric with respect to the lateral axis Y of the outer shell 30.

Figure 17:
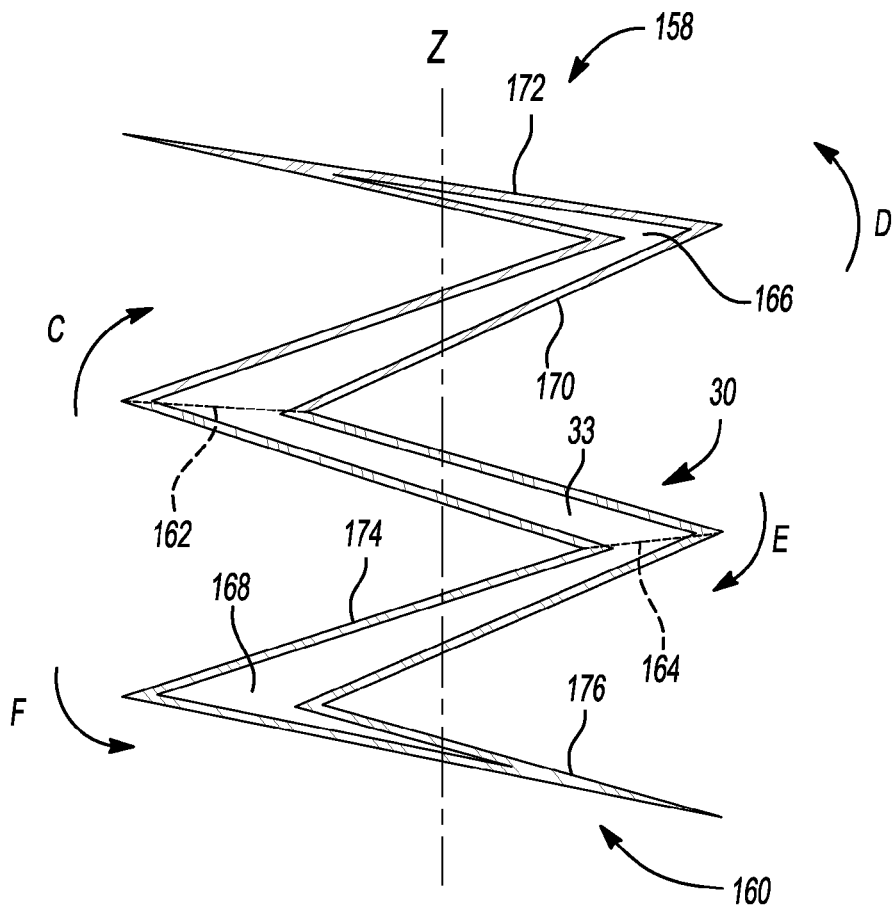
FIGS. 17 and 18 are schematic section views of a variation of the restraint device of FIG. 1 in which the belt includes ten layers and the belt is symmetric with respect to a lateral axis of the belt.
Figure 18:
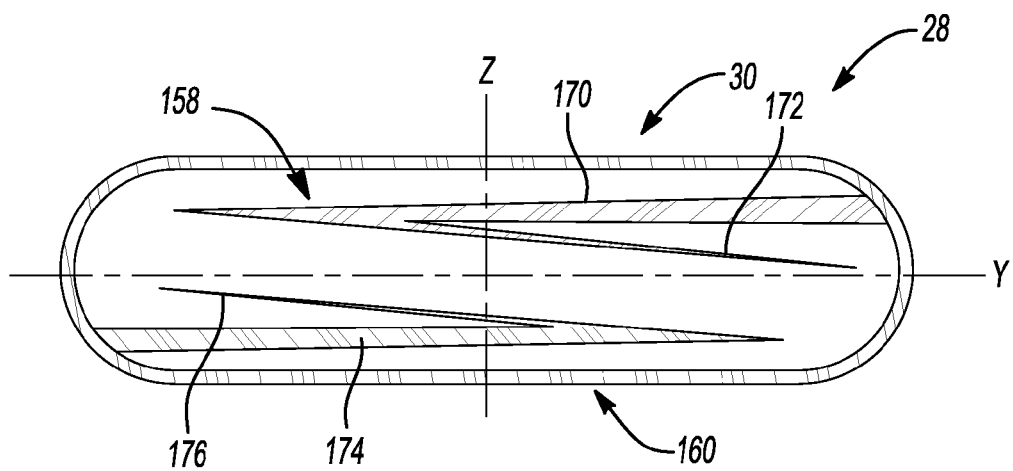

FIGS. 17 and 18 illustrate an alternate configuration of the belt 12 including ten layers disposed symmetrically with respect to the lateral axis Y of the belt 12. The configuration shown in FIGS. 17 and 18 includes first and second wings 158 and 160 in place of the first and second wings 32a and 32b. The wings 158, 160 may be approximately twice as wide as the wings 32a, 32b.

FIG. 17 shows a cross section of the winged section 28 of the belt 12 after the wings 158, 160 are folded and before the belt 12 is inverted. Tear seams 162, 164 separate sealed interiors 166, 168 of the wings 158, 160 from the sealed interior 33 of the outer shell 30. To achieve the configuration shown in FIG. 16, a full fold 170 is made by folding up the first wing 158 at the tear seam 162 in the direction C, and a full fold 172 is made by folding up the first wing 158 in the direction D. Similarly, a full fold 174 is made by folding down the second wing 160 at the tear seam 164 in the direction E, and a full fold 176 is made by folding down the second wing 160 in the direction F.

FIG. 18 illustrates the 10-layer symmetrical configuration of the belt 12 shown in FIG. 17 after the belt 12 is inverted. As shown in FIG. 18, the widths of the full folds 170, 172, 174, 176 of the wings 124, 126 are approximately equal to the width of the outer shell 30. Thus, the winged section 28 includes ten layers at any cross section thereof along the vertical axis Z extending through the thickness of the belt 12. In addition, the belt 12 is symmetric with respect to the lateral axis Y of the outer shell 30.

Figure 19:
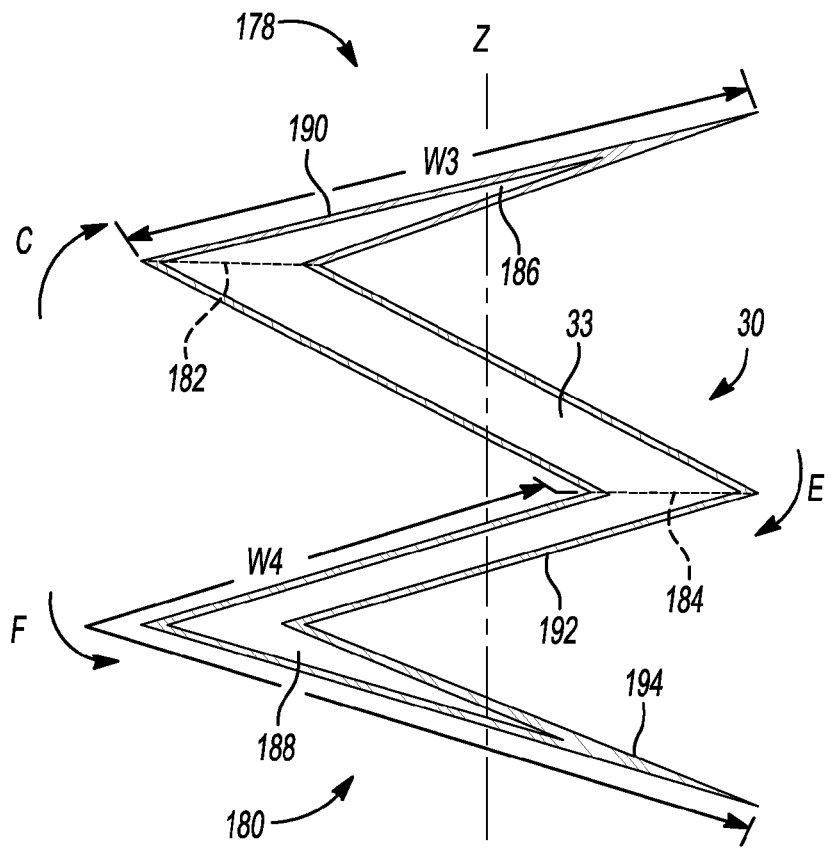
FIGS. 19 and 20 are schematic section views of a variation of the restraint device of FIG. 1 in which the belt includes eight layers and the belt is asymmetric with respect to a lateral axis of the belt.
Figure 20:
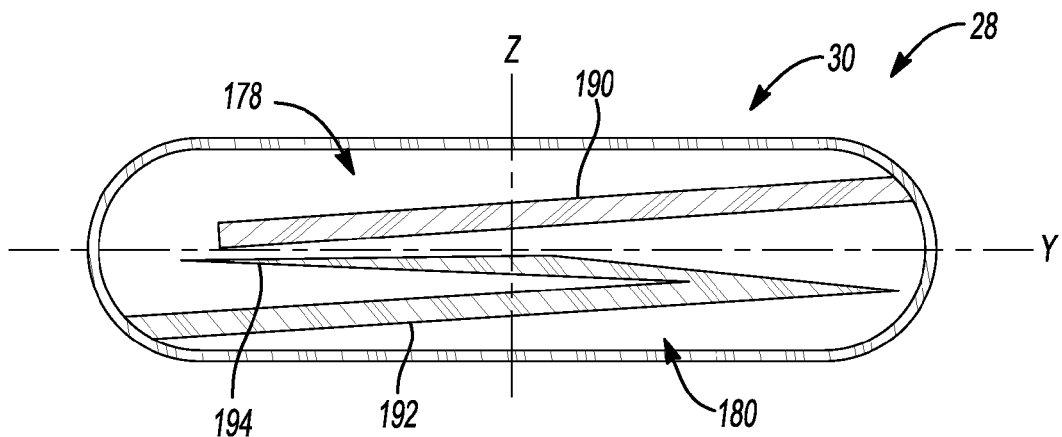

FIGS. 19 and 20 illustrate an alternate configuration of the belt 12 including eight layers disposed asymmetrically with respect to the lateral axis Y of the belt 12. It may be desirable to arrange the belt 12 in an asymmetrical configuration such as that shown in FIGS. 19 and 20 such that one side of the inflatable portion 14 inflates more than the other side of the inflatable portion 14.

The configuration shown in FIGS. 19 and 20 includes first and second wings 178 and 180 in place of the first and second wings 32a and 32b. A width W3 of the first wing 178 may approximately equal to the width W1 (FIG. 6) of the first wing 32a. A width W4 of the second wing 180 may approximately two times greater than the width of the width W2 (FIG. 6) of the second wing 32b.

FIG. 19 shows a cross section of the winged section 28 of the belt 12 after the wings 178, 180 are folded and before the belt 12 is inverted. Tear seams 182, 184 separate sealed interiors 186, 188 of the wings 178, 180 from the sealed interior 33 of the outer shell 30. To achieve the configuration shown in FIG. 19, a full fold 190 is made by folding up the first wing 178 at the tear seam 182 in the direction C. In addition, a full fold 192 is made by folding down the first wing 178 at the tear seam 184 in the direction E, and a full fold 194 is made by folding down the second wing 180 in the direction F.

FIG. 20 illustrates the 8-layer asymmetrical configuration of the belt 12 shown in FIG. 19 after the belt 12 is inverted. As shown in FIG. 20, the widths of the full folds 190, 192, 194 of the wings 178, 180 are approximately equal to the width of the outer shell 30. Thus, the winged section 28 includes eight layers at any cross section thereof along the vertical axis Z extending through the thickness of the belt 12. In addition, the width W4 of the second wing 180 is approximately two times greater than the width W3 of the first wing 178, and therefore the second wing 180 includes one more full fold (i.e., two more layers) than the first wing 178. Thus, the belt 12 is asymmetric with respect to the lateral axis Y of the outer shell 30.

FIGS. 21 through 28 illustrate various 8-layer symmetrical configurations of the belt 12 similar to that shown in FIG. 10 with the full folds and half folds in the wings 124, 126 made in a variety of different directions. To achieve the configurations shown in FIGS. 21 through 24, the wings 124, 126 are folded into a Z-shaped configuration, half folds are made in the wings 124, 126, and the belt 12 is inverted. Folding the wings 124, 126 in the manner just described yields a full fold 196 and a half fold 198 in the first wing 124, and a full fold 200 and a half fold 202 in the second wing 126. Each of the full folds 196, 200 and the half folds 198, 202 have two layers. Thus, when accounting for the first and second layers 60 and 62 of the outer shell 30, the belt 12 has eight layers along any line parallel to the vertical axis Z.

Figure 21:
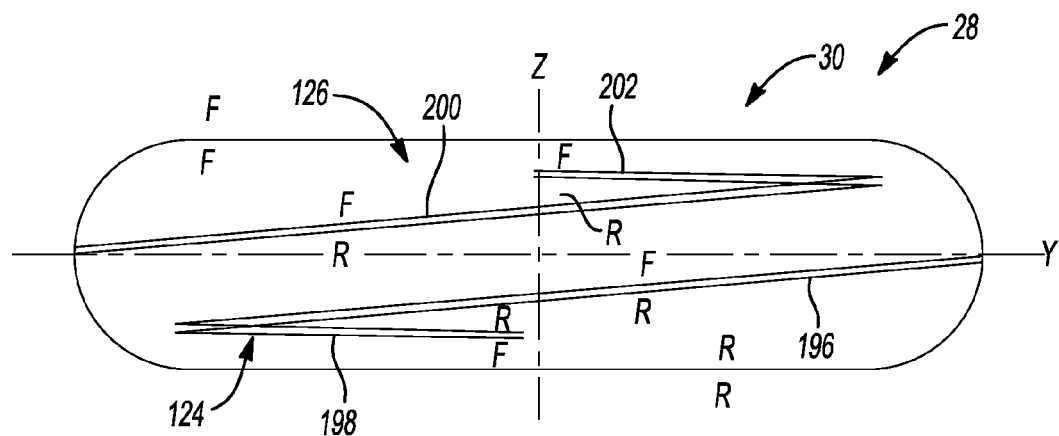
FIGS. 21 through 28 are schematic section views of variations of the restraint device of FIG. 1 illustrating various directions in which wings of the belt may be folded.
Figure 22:
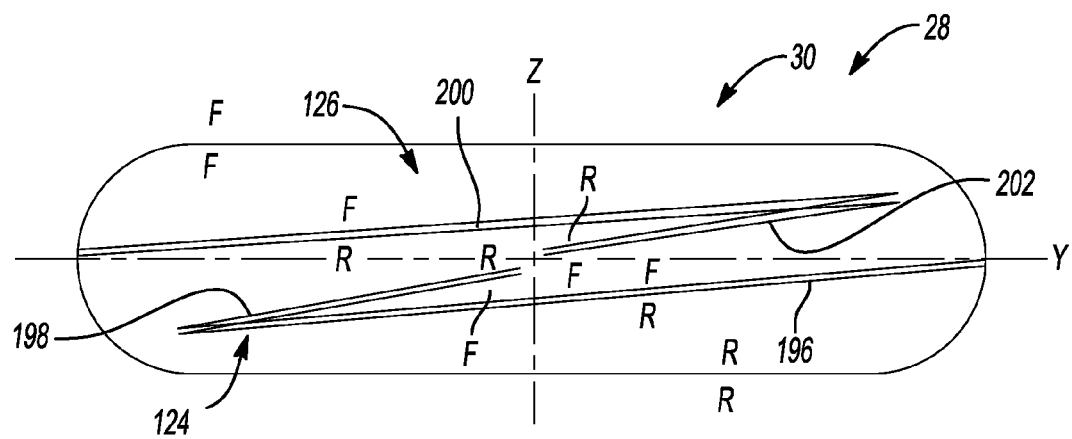
Figure 23:
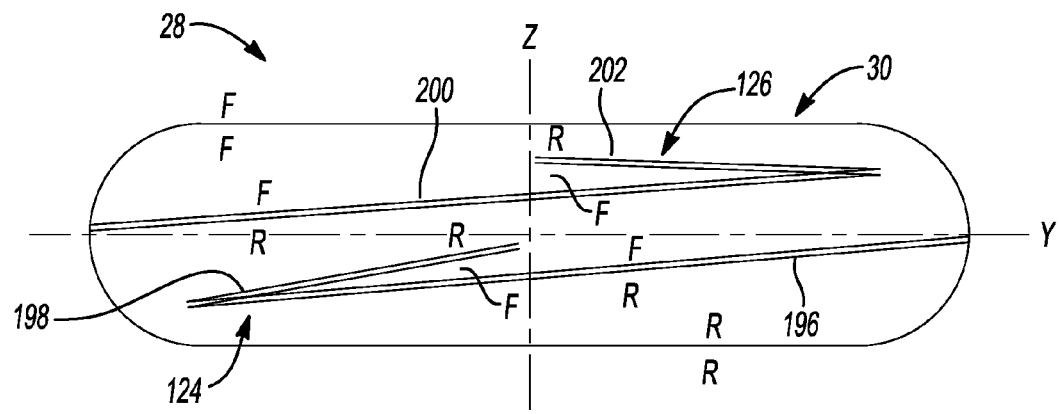
Figure 24:
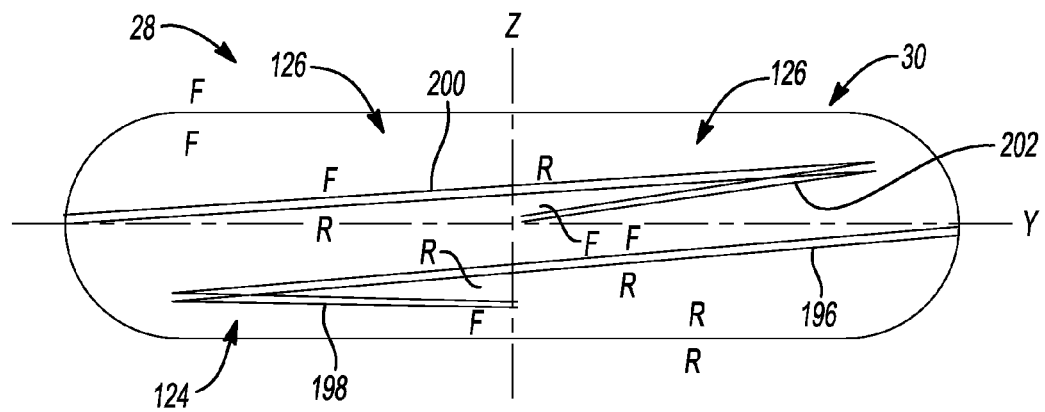

FIG. 21 illustrates the cross section through the thickness of the winged section 28 of the belt 12 after the belt 12 is inverted when the half folds 198, 202 are both folded up before the belt 12 is inverted. FIG. 22 illustrates the cross section of the winged section 28 after the belt 12 is inverted when the half folds 198, 202 are both folded down before the belt 12 is inverted. FIG. 23 illustrates the cross section of the winged section 28 after the belt 12 is inverted when, before the belt 12 is inverted, the half fold 198 is folded down and the half fold 202 is folded up. FIG. 24 illustrates the cross section of the winged section 28 after the belt 12 is inverted when, before the belt 12 is inverted, the half fold 198 is folded up and the half fold 202 is folded down.

Figure 25:
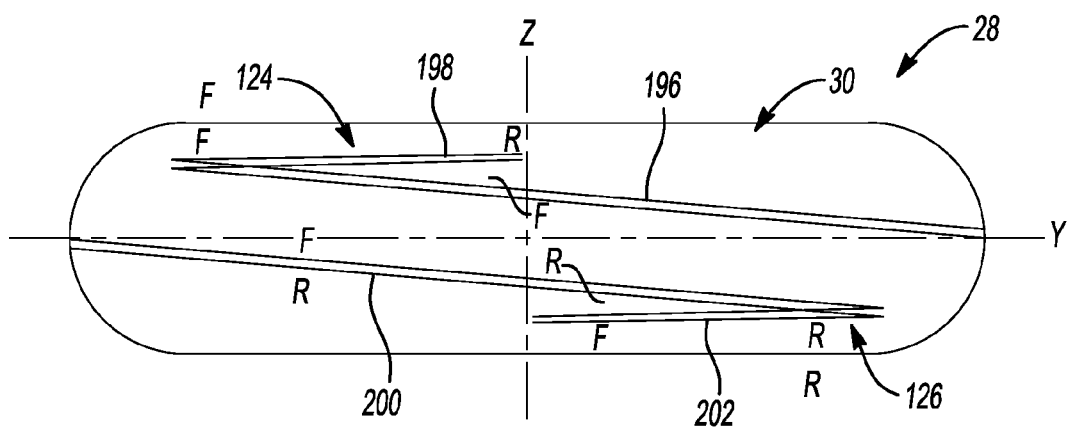
Figure 26:
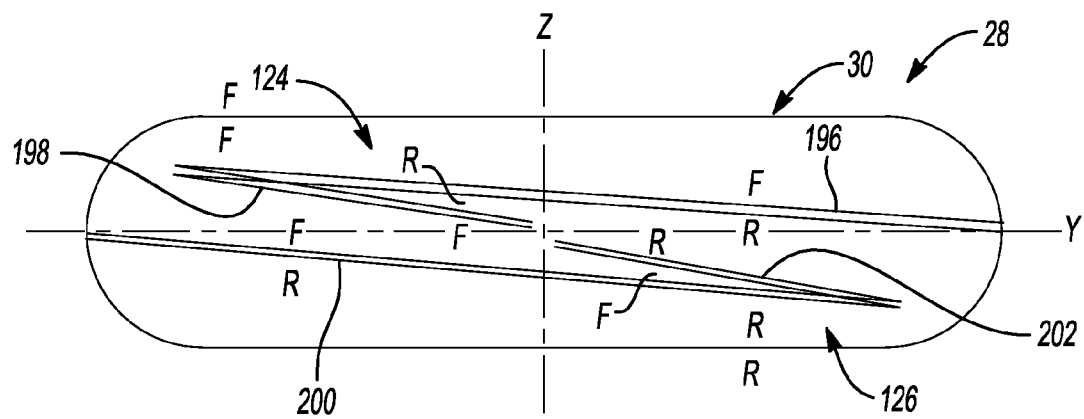
Figure 27:
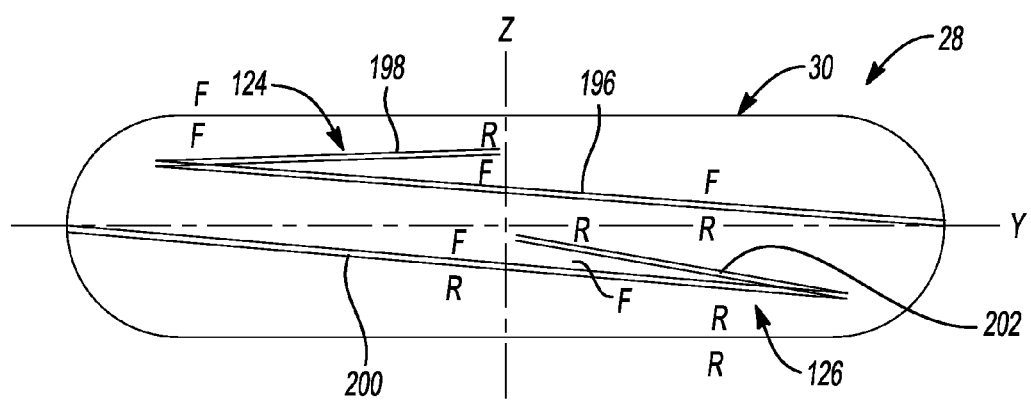
Figure 28:
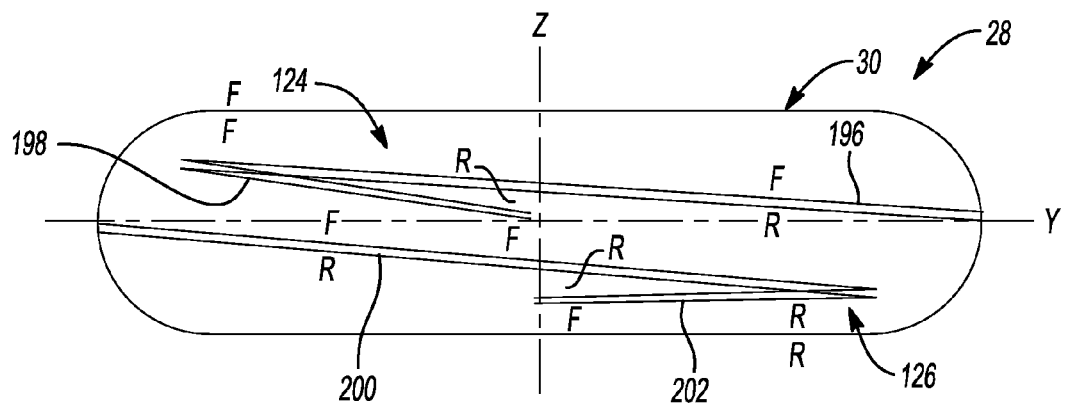

To achieve the configurations shown in FIGS. 25 through 28, the wings 124, 126 are folded into an S-shaped configuration, half folds are made in the wings 124, 126, and the belt 12 is inverted. FIG. 25 illustrates the cross section through the thickness of the winged section 28 after the belt 12 is inverted when the half folds 198, 202 are both folded up before the belt 12 is inverted. FIG. 26 illustrates the cross section of the winged section 28 after the belt 12 is inverted when the half folds 198, 202 are both folded down before the belt 12 is inverted. FIG. 27 illustrates the cross section of the winged section 28 after the belt 12 is inverted when, before the belt 12 is inverted, the half fold 198 is folded up and the half fold 202 is folded down. FIG. 28 illustrates the cross section of the winged section 28 after the belt 12 is inverted when, before the belt 12 is inverted, the half fold 198 is folded down and the half fold 202 is folded up.

FIGS. 29 through 32 illustrate some of the possible positions of the gas guide 20 when the belt 12 is folded and inverted to yield the 8-layer symmetrical configuration shown in FIG. 22. The position of the gas guide 20 relative to the folds in the belt 12 may affect the manner in which the gas guide 20 distributes gas to the inflatable portion 14 of the belt 12. Different gas distributions may be desired for different vehicle applications. Thus, the various positions of the gas guide 20 relative to the folds in the belt 12 presented herein provide design flexibility to control the distribution of gas from the gas guide 20.

If the half folds 198, 202 were omitted such that the belt 12 had a 6-layer configuration such as that shown in FIG. 12, the gas guide 20 may be positioned in an area 204 between the outer shell 30 and the second wing 126. Alternately, the gas guide 20 may be positioned in an area 206 between the first and second wings 124 and 126 or an area 208 between the first wing 124 and the outer shell 30. Positioning the gas guide 20 in the area 206 may provide the most uniform distribution of pressurized gas within the inflatable portion 14. The tether 22 may maintain the position of the gas guide 20 in a desired position, such as in the area 206, as the inflatable portion 14 of the belt 12 is deployed.

Figure 29:
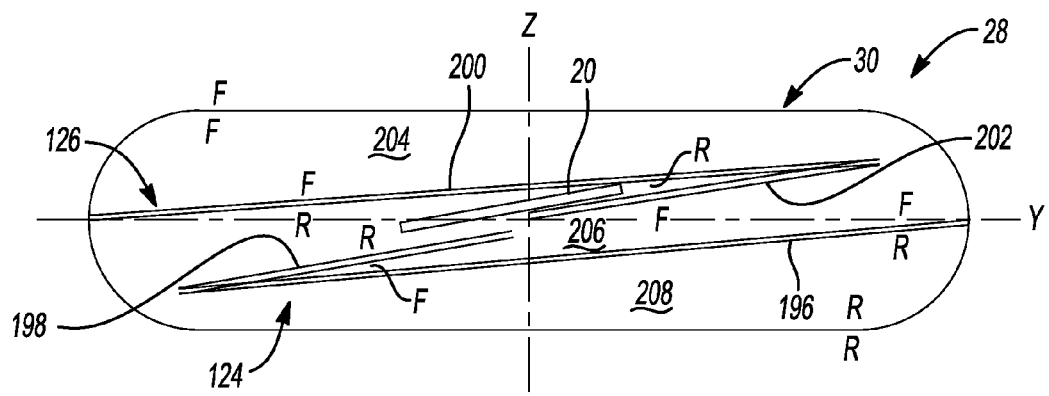
FIGS. 29 through 32 are schematic section views of variations of the restraint device of FIG. 1 illustrating various positions in which the gas guide may be located relative to folds in the wings of the belt.
Figure 30:
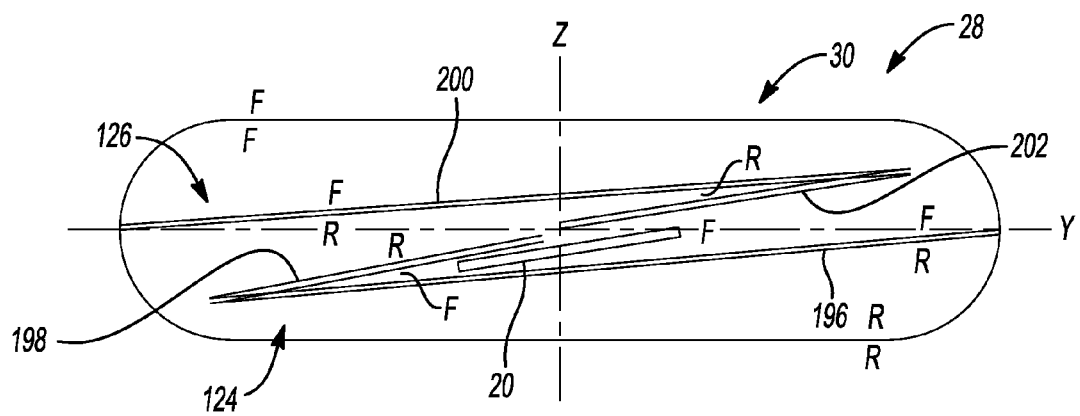
Figure 31:
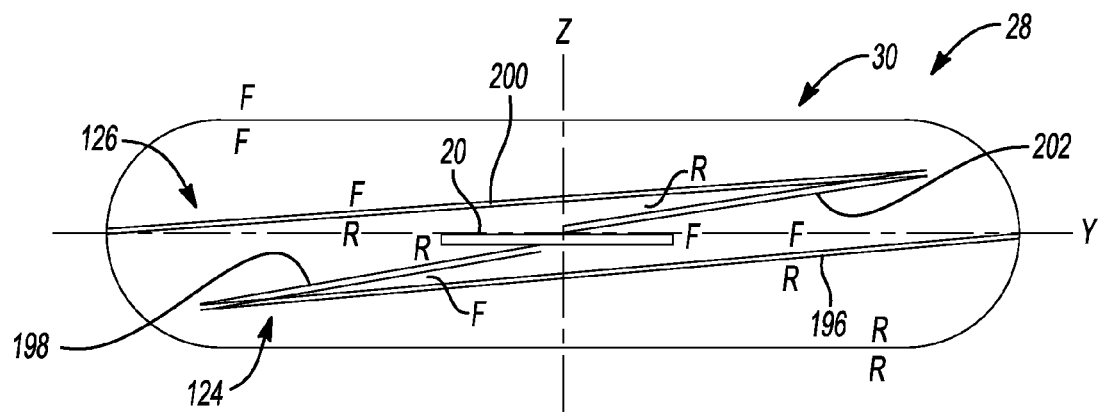
Figure 32:
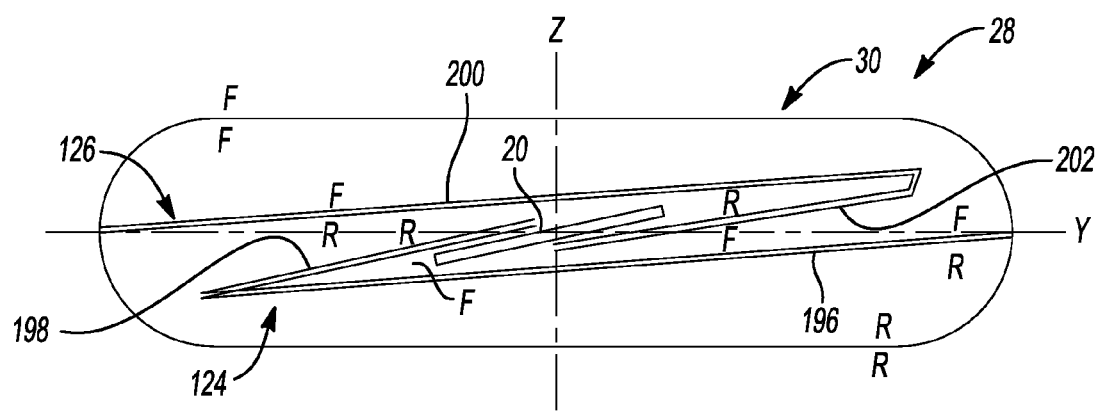

FIGS. 29 through 32 show the gas guide 20 is positioned in the area 206 and illustrate various ways in which the gas guide 20 may be positioned relative to the half folds 198, 202. In FIG. 29, the gas guide 20 is positioned between the full fold 200 in the second wing 126 and the half fold 202 in the second wing 126. In FIG. 30, the gas guide 20 is positioned between the full fold 196 in the first wing 124 and the half fold 198 in the first wing 124. In both FIGS. 31 and 32, the gas guide 20 is positioned between the half folds 198, 202. However, in FIG. 31, the gas guide 20 does not extend into the areas between the full folds 196, 200 and the half folds 198, 202, respectively. Meanwhile, in FIG. 32, the gas guide 20 does extend into the areas between the full folds 196, 200 and the half folds 198, 202, respectively.

FIGS. 21 through 28 illustrate eight out of at least 24 possible configurations of the belt 12 when the belt 12 includes the wings 126, 128 having the full folds 196, 200 and the half folds 198, 202. FIGS. 29 through 32 illustrate four possible positions of the gas guide 20 for only one out of the eight possible configurations of the belt 12 shown in FIGS. 21 through 28. Thus, when accounting for the multiple ways to locate the gas guide 20 relative to the wings 126, 128, there are at least 42 possible configurations of the belt 12.

Figure 33:
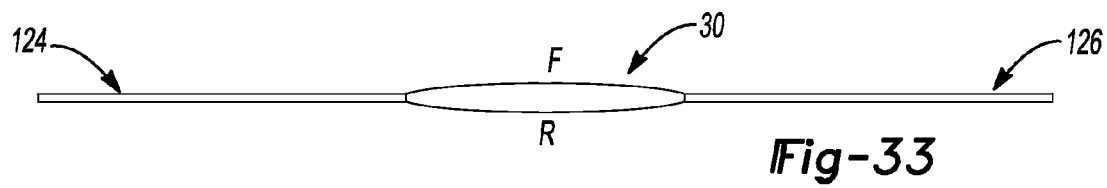
FIGS. 33 through 39 illustrate a process of assembling a belt and a gas guide according to the principles of the present disclosure.

FIGS. 33 through 39 illustrate a method of folding the belt 12 and position the gas guide 20 to achieve a desired configuration. In FIG. 33, the wings 126, 128 have not yet been folded. The fine side F of the belt 12 may be positioned facing up, and the rough side R of the belt 12 may be positioned facing down.

Figure 34:
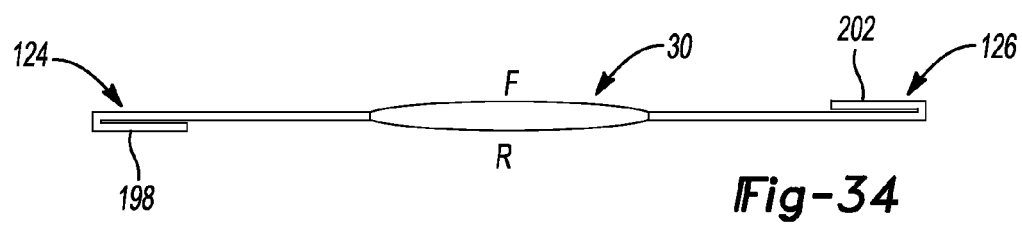
Figure 35:
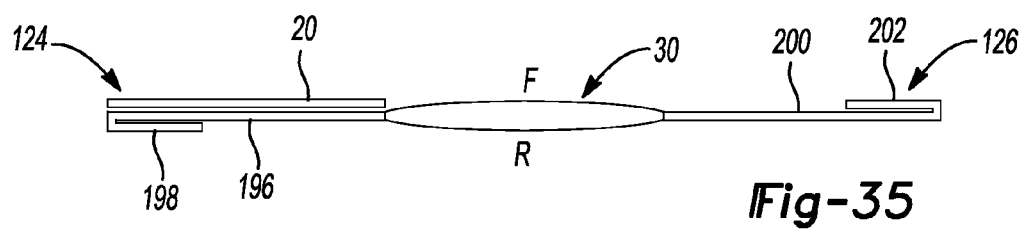
Figure 36:
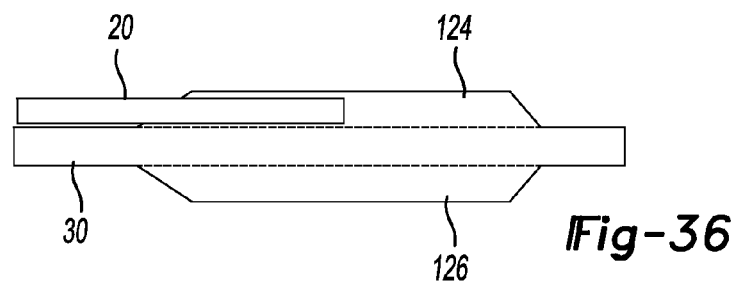
Figure 37:
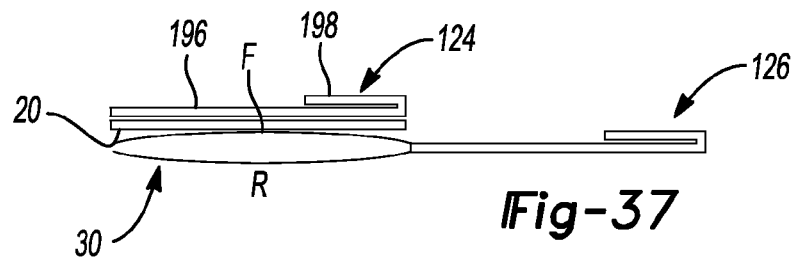
Figure 38:
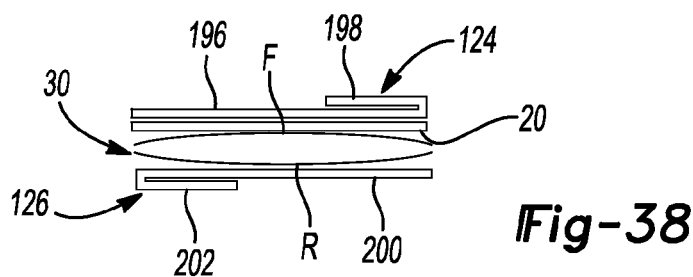
Figure 39:
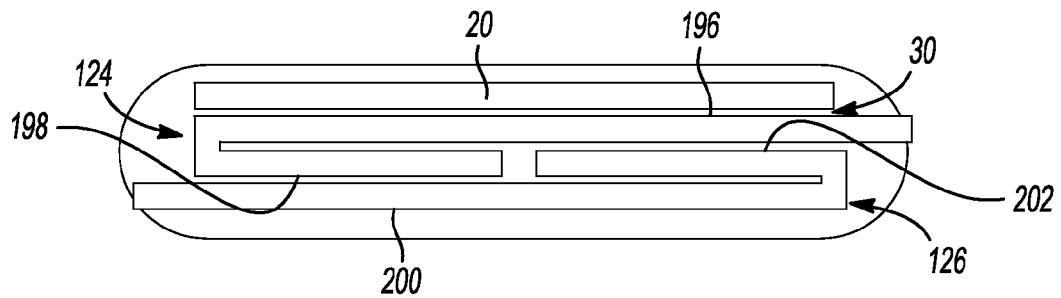

In FIG. 34, the half fold 198 in the first wing 124 is folded down toward the rough side R of the belt 12, and the half fold 202 in the second wing 126 is folded up toward the fine side F of the belt 12. In FIGS. 35 and 36, the gas guide 20 is attached to the first wing 124 on the fine side F of the belt 12. The gas guide 20 may be attached to the first wing 124 using adhesive, stitching, and/or thermal bonding. In FIG. 37, the first wing 124 is folded up onto the fine side F of the outer shell 30. In FIG. 38, the second wing 126 is folded down onto the rough side R of the outer shell 30. The entire length of the outer shell 30 may then be inverted to yield the configuration shown in FIG. 39.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A restraint device for restraining an occupant in a vehicle, comprising:
a belt including a first layer, a second layer, and a seal between the first and second layers, the first and second layers extending from a first end of the belt to a second end of the belt, the seal cooperating with the first and second layers to form an inflatable portion of the belt;
a gas guide configured to deliver a pressurized gas from an inflator to the inflatable portion of the belt; and
an elongated tether having a first end and a spaced apart second end, the first end attached to the gas guide and the second end attached to an inner surface of the belt to secure the gas guide to the belt,
wherein the tether is formed from a fabric.

2. The restraint device of claim 1, wherein the tether includes a flat strip of material.

3. The restraint device of claim 2, wherein the tether is configured to maintain a position of the gas guide as the belt is deployed.

4. The restraint device of claim 2, wherein the tether allows the gas guide to move radially within the inflatable portion of the belt while limiting axial movement of the gas guide.

5. The restraint device of claim 2, wherein the gas guide defines radial holes disposed around an entire perimeter of the gas guide.

6. The restraint device of claim 2, wherein the gas guide defines angled slits disposed on opposite sides of the gas guide.

7. A restraint device for restraining an occupant in a vehicle, comprising:
a belt including a first layer, a second layer, and a seal between the first and second layers, the first and second layers extending from a first end of the belt to a second end of the belt, the seal cooperating with the first and second layers to form an inflatable portion of the belt;
an inflator operable to provide pressurized gas;
a gas guide having a first end placed over an outlet of the inflator and a second end extending into the inflatable portion of the belt; and
a flexible tether having first and second spaced apart tether ends, the first tether end attached to the belt and the second tether end attached to the gas guide such that the flexible tether secures the gas guide to the belt,
wherein the flexible tether is formed from a fabric.

8. The restraint device of claim 7, wherein the flexible tether is configured to absorb shock when the inflatable portion of the belt is deployed.

9. The restraint device of claim 7, wherein the flexible tether is formed from a flexible material.

10. The restraint device of claim 7, wherein longitudinal edges of the tether are disposed at a non-orthogonal angle relative to warps and wefts of the fabric.

11. The restraint device of claim 7, wherein the flexible tether is configured to increase in length from a first length to a second length when the inflatable portion of the belt is deployed.

12. A restraint device for restraining an occupant in a vehicle, comprising:
a belt including a first layer, a second layer, and a seal between the first and second layers, the first and second layers extending from a first end of the belt to a second end of the belt, the seal cooperating with the first and second layers to form an inflatable portion of the belt, the inflatable portion having a winged section including a first wing, a second wing, and a tear seam separating an interior of the inflatable portion from interiors of the first and second wings, the first and second wings being disposed within the inflatable portion;
a gas guide having a first end for placement over an outlet of an inflator operable to provide pressurized gas and a second end extending into the inflatable portion of the belt; and
a tether that secures the gas guide to the belt.

13. The restraint device of claim 12, wherein the second end of the gas guide is disposed between one of the first and second layers of the belt and one of the first and second wings.

14. The restraint device of claim 12, wherein the second end of the gas guide is disposed in the winged section of the inflatable portion of the belt.

15. The restraint device of claim 14, wherein the tether has a first end attached to the gas guide and second end attached to the belt at a location that is outside of the winged section of the inflatable portion of the belt.

16. The restraint device of claim 15, wherein the second end of the tether is attached to the belt at a location that is configured to be spaced apart from the occupant of a vehicle when the belt is fastened around the occupant.

17. The restraint device of claim 12, wherein the second end of the gas guide is disposed between the first and second wings.

18. The restraint device of claim 17, wherein the tether is configured to maintain the gas guide in position between the first and second wings as the inflatable portion of the belt is deployed.

19. A restraint device for restraining an occupant in a vehicle, comprising:
a belt including an inflatable portion;
a gas guide configured to deliver a pressurized gas from an inflator to the inflatable portion of the belt; and
an elongated tether having a first end and a spaced apart second end, the first end attached to the gas guide and the second end attached to the belt to secure the gas guide to the belt;
wherein the tether is formed from a fabric.

* * * * *